United States Patent
Brombach

(10) Patent No.: US 11,088,546 B2
(45) Date of Patent: Aug. 10, 2021

(54) METHOD AND WIND TURBINE FOR FEEDING ELECTRIC POWER

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 235 days.

(21) Appl. No.: 16/090,773

(22) PCT Filed: Apr. 5, 2017

(86) PCT No.: PCT/EP2017/058082
§ 371 (c)(1),
(2) Date: Oct. 2, 2018

(87) PCT Pub. No.: WO2017/174644
PCT Pub. Date: Oct. 12, 2017

(65) Prior Publication Data
US 2020/0328599 A1 Oct. 15, 2020

(30) Foreign Application Priority Data
Apr. 5, 2016 (DE) .................... 10 2016 106 215.4

(51) Int. Cl.
*H02J 3/38* (2006.01)
*F03D 9/25* (2016.01)
(Continued)

(52) U.S. Cl.
CPC .............. *H02J 3/381* (2013.01); *F03D 9/257* (2017.02); *H02J 3/001* (2020.01);
(Continued)

(58) Field of Classification Search
CPC ...... H02J 3/381; H02J 3/001; H02J 13/00002; H02J 2300/28; H02J 2203/20; F03D 9/257
See application file for complete search history.

(56) References Cited

U.S. PATENT DOCUMENTS

| 5,747,887 A | 5/1998 | Takanaga et al. |
| 6,445,089 B1 | 9/2002 | Okui |

(Continued)

FOREIGN PATENT DOCUMENTS

| CN | 101142731 A | 3/2008 |
| CN | 101228351 A | 7/2008 |

(Continued)

OTHER PUBLICATIONS

Hansen et al., "Centralised power control of wind farm with doubly fed induction generators," *Renewable Energy* 31:935-951, Aug. 10, 2005.

(Continued)

*Primary Examiner* — Sean Gugger
(74) *Attorney, Agent, or Firm* — Seed IP Law Group LLP

(57) ABSTRACT

A method for feeding electrical power into an electrical supply grid by means of at least one wind power installation or of a wind farm having a plurality of wind power installations at a grid connection point, wherein a plurality of energy generators feed power into the electrical supply grid and a plurality of consumers draw power from the electrical supply grid so that a power balance between the infed power and the drawn power results in the electrical supply grid, which power balance is positive when more power is fed in than drawn, and the method comprises the following steps: monitoring of a power indicator that is representative of the power balance in the electrical supply grid, determination of an amount of balancing energy depending on the power indicator, infeed of a basic electrical power depending on the (Continued)

available wind power, and changing of the infeed of the basic electrical power by the determined amount of balancing energy.

18 Claims, 5 Drawing Sheets

(51) Int. Cl.
    *H02J 3/00* (2006.01)
    *H02J 13/00* (2006.01)
(52) U.S. Cl.
    CPC ..... *H02J 13/00002* (2020.01); *H02J 2203/20* (2020.01); *H02J 2300/28* (2020.01)

(56) References Cited

U.S. PATENT DOCUMENTS

| | | | |
|---|---|---|---|
| 6,784,564 | B1 | 8/2004 | Wobben |
| 6,891,281 | B2 | 5/2005 | Wobben |
| 6,924,565 | B2 | 8/2005 | Wilkins et al. |
| 6,946,751 | B2 | 9/2005 | Yoshida et al. |
| 6,965,174 | B2 | 11/2005 | Wobben |
| 7,197,378 | B2 | 3/2007 | Sato et al. |
| 7,397,143 | B2 | 7/2008 | Walling |
| 7,528,496 | B2 | 5/2009 | Fortmann |
| 7,741,728 | B2 | 6/2010 | Fortmann et al. |
| 7,908,036 | B2 | 3/2011 | Kirchner et al. |
| 7,952,214 | B2 | 5/2011 | Ichinose et al. |
| 7,983,799 | B2 | 7/2011 | Bose et al. |
| 8,049,352 | B2 | 11/2011 | Jørgensen et al. |
| 8,084,874 | B2 | 12/2011 | Llorente González |
| 8,174,143 | B2 | 5/2012 | Yasugi |
| 8,242,753 | B2 | 8/2012 | Engelhardt et al. |
| 8,247,917 | B2 | 8/2012 | Yasugi et al. |
| 8,299,650 | B2 | 10/2012 | Yasugi |
| 8,312,733 | B2 | 11/2012 | Tsarev et al. |
| 8,395,360 | B2 | 3/2013 | Tripathi et al. |
| 8,527,104 | B2 | 9/2013 | Arinaga et al. |
| 8,692,419 | B2 | 4/2014 | Fortmann et al. |
| 8,698,461 | B2 | 4/2014 | Engelhardt et al. |
| 8,779,610 | B2 | 7/2014 | Luetze |
| 8,934,270 | B2 | 1/2015 | Letas |
| 8,946,916 | B2 | 2/2015 | Tarnowski |
| 8,957,536 | B2 | 2/2015 | Gupta et al. |
| 8,981,708 | B2 | 3/2015 | Diedrichs et al. |
| 8,994,202 | B2 | 3/2015 | Gupta et al. |
| 9,106,152 | B2 | 8/2015 | De Brabandere et al. |
| 9,166,509 | B2 | 10/2015 | Egedal et al. |
| 9,209,711 | B2 | 12/2015 | Farkas |
| 9,461,572 | B2 | 10/2016 | Wessels |
| 9,509,141 | B2 | 11/2016 | Egedal et al. |
| 9,677,544 | B2 | 6/2017 | Li et al. |
| 9,690,267 | B2 | 6/2017 | Haj-Maharsi et al. |
| 9,705,334 | B2 | 7/2017 | Giertz |
| 9,755,430 | B2 | 9/2017 | Paquin et al. |
| 9,957,952 | B2 | 5/2018 | Giertz |
| 9,979,192 | B2 | 5/2018 | Shao et al. |
| 10,066,602 | B2 | 9/2018 | Beekmann et al. |
| 2002/0036911 | A1 | 3/2002 | Okui |
| 2004/0207264 | A1 | 10/2004 | Sato et al. |
| 2005/0040655 | A1 | 2/2005 | Wilkins et al. |
| 2008/0143304 | A1 | 6/2008 | Bose et al. |
| 2008/0239770 | A1 | 10/2008 | Punzet et al. |
| 2008/0252076 | A1 | 10/2008 | Fortmann et al. |
| 2008/0252143 | A1 | 10/2008 | Llorente Gonzalez et al. |
| 2008/0296898 | A1 | 12/2008 | Ichinose et al. |
| 2009/0206603 | A1 | 8/2009 | Llorente Gonzalez |
| 2010/0119370 | A1 | 5/2010 | Myhr |
| 2010/0138058 | A1 | 6/2010 | Kirchner et al. |
| 2010/0298991 | A1 | 11/2010 | Alonso Sadaba et al. |
| 2010/0332042 | A1 | 12/2010 | Riesberg et al. |
| 2012/0061959 | A1 | 3/2012 | Yasugi et al. |
| 2012/0139241 | A1 | 6/2012 | Haj-Maharsi et al. |
| 2012/0261917 | A1 | 10/2012 | Egedal et al. |
| 2012/0268081 | A1 | 10/2012 | Tripathi et al. |
| 2013/0015660 | A1 | 1/2013 | Hesselbæk et al. |
| 2013/0043825 | A1 | 2/2013 | Diedrichs et al. |
| 2013/0141951 | A1 | 6/2013 | Adloff |
| 2013/0147442 | A1 | 6/2013 | Tripathi et al. |
| 2013/0170254 | A1 | 7/2013 | Letas |
| 2013/0182477 | A1 | 7/2013 | De Brabandere et al. |
| 2013/0221934 | A1 | 8/2013 | Wakasa et al. |
| 2013/0249215 | A1 | 9/2013 | Egedal et al. |
| 2013/0300116 | A1 | 11/2013 | Egedal et al. |
| 2014/0084587 | A1 | 3/2014 | Beekmann |
| 2014/0225446 | A1 | 8/2014 | Giertz |
| 2014/0362623 | A1 | 12/2014 | Farkas |
| 2015/0124496 | A1 | 5/2015 | Yu et al. |
| 2015/0159627 | A1 | 6/2015 | Nielsen et al. |
| 2015/0198145 | A1 | 7/2015 | Diedrichs et al. |
| 2015/0240784 | A1* | 8/2015 | Sagi ............... F03D 9/11 700/287 |
| 2015/0280629 | A1 | 10/2015 | Diedrichs et al. |
| 2015/0365031 | A1 | 12/2015 | Wessels |
| 2016/0036229 | A1* | 2/2016 | Shao ............... H02J 3/381 700/298 |
| 2016/0084892 | A1 | 3/2016 | Nielsen |
| 2016/0087445 | A1 | 3/2016 | Beekmann et al. |
| 2016/0134121 | A1 | 5/2016 | Bartsch |
| 2016/0161538 | A1 | 6/2016 | Wang et al. |
| 2016/0173017 | A1 | 6/2016 | Beekmann |
| 2016/0226258 | A1 | 8/2016 | Giertz |
| 2016/0273520 | A1* | 9/2016 | Giertz ............... F03D 80/60 |
| 2017/0074244 | A1 | 3/2017 | Huang et al. |
| 2017/0077711 | A1 | 3/2017 | Oesselke et al. |
| 2017/0070055 | A1 | 5/2017 | Bamberger et al. |
| 2017/0234299 | A1 | 8/2017 | Kjær et al. |

FOREIGN PATENT DOCUMENTS

| | | |
|---|---|---|
| CN | 101467343 A | 6/2009 |
| CN | 102150356 A | 8/2011 |
| DE | 102006027465 A1 | 12/2007 |
| DE | 102005049426 B4 | 12/2009 |
| DE | 102009014012 A1 | 9/2010 |
| DE | 102008037449 B4 | 10/2010 |
| DE | 102011007037 A1 | 1/2012 |
| DE | 102005041927 B4 | 2/2013 |
| DE | 102013222452 A1 | 5/2015 |
| DE | 102014209541 A1 | 11/2015 |
| EP | 1775819 A2 | 4/2007 |
| EP | 2187048 A1 | 5/2010 |
| EP | 2282053 A1 | 2/2011 |
| EP | 2375561 A1 | 10/2011 |
| EP | 1665494 B1 | 5/2012 |
| EP | 2527647 A1 | 11/2012 |
| EP | 2790287 A2 | 10/2014 |
| EP | 2921698 A1 | 9/2015 |
| EP | 2999076 A1 | 3/2016 |
| JP | 4-325832 A | 11/1992 |
| JP | 2004301116 A | 10/2004 |
| JP | 2009174329 A | 8/2009 |
| KR | 1020130085830 A | 7/2013 |
| RU | 2221165 C2 | 1/2004 |
| WO | 00/74198 A1 | 12/2000 |
| WO | 03058063 A1 | 7/2003 |
| WO | 2009078073 A1 | 6/2009 |
| WO | 2009083445 A1 | 7/2009 |
| WO | 2010073310 A1 | 7/2010 |
| WO | 2011158351 A1 | 12/2011 |
| WO | 2012000508 A2 | 1/2012 |
| WO | 2012026014 A1 | 3/2012 |
| WO | 2012056570 A1 | 5/2012 |
| WO | 2012070141 A1 | 5/2012 |
| WO | 2012076015 A2 | 6/2012 |
| WO | 2012171532 A2 | 12/2012 |

OTHER PUBLICATIONS

Chen, "Wind power in modern power systems", J. Mod. Power Syst. Clean Energy (2013), 1(1):2-13.

(56) References Cited

OTHER PUBLICATIONS

Qu et al., "Constant Power Control of DFIG Wind Turbines With Supercapacitor Energy Storage", IEEE Transactions on Industry Applications, vol. 47, No. 1, Jan. 2011, pp. 359-367.

Yuen et al., "The Provision of Frequency Control Reserves From Multiple Microgrids", IEEE Transactions on Industrial Electronics, vol. 58, No. 1, Jan. 2011, pp. 173-183.

\* cited by examiner $$\Delta P = P_1 - P_2 + P_3 + P_4 - P_5 - P_6 + P_7$$
$$P_3 = P_{31} - P_{32} + P_{33}$$

METHOD AND WIND TURBINE FOR FEEDING ELECTRIC POWER

BACKGROUND

Technical Field

The present invention relates to a method for feeding electrical power into an electrical supply grid. The present invention furthermore relates to a wind power installation for feeding electrical power into an electrical supply grid. The present invention also relates to a wind farm having a plurality of wind power installations in order to feed into an electrical supply grid using said wind farm.

Description of the Related Art

It is known to feed electrical power into an electrical supply grid by means of wind power installations or wind farms. In the meantime, it is also known to provide what are known as system services along with wind power installations or wind farms, which system services help to electrically support and/or to improve the electrical supply grid.

It is particularly problematic when the power to be fed in is intended to be increased to support the electrical supply grid because wind power installations regularly feed in as much power as they can currently draw from the wind. To this end, for the purpose of improvement, it has been proposed, even for temporary increases in power, to use power from the centrifugal mass of the rotating rotor. However, if an increased power is fed in and power from the rotating rotor is used as well, said rotor slows down so that the infed power that is accordingly increased can be fed in only for a short period.

Furthermore, many grid operators are also still currently relying on the grid-supporting properties of large connected synchronous machines, which operate, in particular, as generators of conventional power plants, particularly of nuclear power plants, coal power plants and gas power plants. Such support still appears to be desired by some grid operators. Nevertheless, the network topography is changing, at least in some countries, so that such grid support processes can also be disadvantageous, particularly possibly are not ideal for each situation, due to the physical behavior of the mentioned synchronous generators that are coupled directly to the grid. For example, instabilities can arise due to sub synchronous resonances.

The German Patent and Trademark Office has searched the following prior art in the priority application relating to the present application: DE 10 2009 014 012 A1, DE 10 2014 209 541 A1, US 2015/0159627 A1, EP 1 665 494 B1, EP 2 282 053 A1 and WO 2012/171532 A2.

BRIEF SUMMARY

Provided is a wind power installation or a wind farm that is used to propose grid support or system service to support an electrical supply grid that is as improved as possible compared to known methods. Provided is a solution that can take changed situations, particularly situations that are changed in terms of structure or topology, of an electrical supply grid into account in the grid support. The intention is, at least, to propose an alternative to current solutions.

A method for feeding electrical power into an electrical supply grid by means of at least one wind power installation is therefore proposed and the infeed takes place at a grid connection point of the electrical supply grid. A plurality of energy generators feed power into the electrical supply grid and a plurality of consumers draw power from the electrical supply grid so that a power balance between the infed power and the drawn power results in the electrical supply grid. In the ideal case, said power balance is 0, namely when an identical amount of power is fed in as is drawn. Here, the power balance is assumed to be positive when more power is fed in than drawn. A positive power balance is therefore understood to mean a situation in which an excess of power prevails in the electrical supply grid.

For this purpose, it is proposed to monitor a power indicator that is representative of the power balance in the electrical supply grid. In the simplest case, the power indicator can be the grid frequency or the behavior of the grid frequency, particularly the change thereof. However, other variables are also considered, such as the grid voltage or its behavior, for example. According to one embodiment, the power balance is measured and the power indicator can then correspond directly to the power balance or can be provided as a correspondingly standardized value. Measurement can take place, for example in small grids, by measuring all of the power fed in and all of the power drawn, or by measuring flows of power.

An amount of balancing energy is then determined depending on said power indicator. The wind power installation feeds in a basic electrical power depending on the available wind power. When nominal wind is prevailing, said basic power can be, for example, the nominal power of the wind power installation.

It is now proposed that the infeed of the basic electrical power is changed by the determined amount of balancing energy. If a positive amount of balancing energy has thus been determined depending on the power indicator, particularly when a power demand in the electrical supply grid has been identified, the infeed is increased by said determined, namely positive, amount of balancing energy. Particularly when an excess of power in the grid has been identified, a negative value for the amount of balancing energy can regularly result so that the change of the infeed of the basic electrical power by the determined amount of balancing energy means that the infeed of the basic electrical power is reduced.

To determine an amount of balancing energy depending on the power indicator, the detected excess of power in the electrical supply grid can be divided, for example, among the energy generators of said electrical supply grid according to their size and the result can be multiplied by a reference time interval. To use a simple illustrative example, if an excess of power of 100 MW has been detected and if it is known that an observed wind farm provides approximately 1% of the power of all of the infeeders connected to said electrical supply grid, said 100 MW could accordingly be divided so that said wind farm is assigned 1 MW. Of course, other values and divisions can also be used, in which, for example, only the infeeders that can deliver a system service are taken into account. Weighting is also considered. Coming back to said example, if the reference time interval is now one second, an amount of energy of 1 MWs, that is to say approximately 0.28 kWh, could be calculated as the amount of balancing energy.

However, it is also considered to compile beforehand a corresponding table in which, for example, amounts of balancing energy are assigned to predetermined changes in the grid frequency or predetermined differences between the grid frequency and the nominal frequency of the grid. Said amounts of balancing energy can then be used depending on detected frequency changes or detected frequency deviations. Interpolation between such entries is possible.

Said amount of balancing energy can accordingly be fed in additionally, wherein, in this case, also negative values are considered, and recalculation and correspondingly adjusted infeed can be performed at the end of the reference time interval.

The basic electrical power is preferably determined depending on a wind power that is detected or observed in terms of regulation. It is also considered to determine the basic electrical power depending on a previously determined value of the basic electrical power and further taking into account the previously determined and additionally infed amount of balancing energy. By determining and accordingly additionally feeding in an amount of balancing energy, the behavior of this kind of infeed or support, that is to say the behavior of the corresponding wind power installation, where appropriate of the corresponding wind farm, can be approximated to the behavior of a synchronous generator coupled directly to the electrical supply grid. A synchronous generator coupled directly to the grid also feeds in additional energy originating from its rotational energy physically in the case of a negative power balance and thus in the case of a change in the grid frequency. Said synchronous generator becomes slower as a result. Accordingly, only a specific amount of energy is actually additionally fed in and such an amount of energy is also not available in any desirable amount.

An energy reserve can also preferably be predetermined for the proposed infeed by means of a wind power installation or of a wind farm and the amount of balancing energy can be determined depending on said predetermined energy reserve. Particularly during the determination of a positive amount of balancing energy, said positive amount of balancing energy can depend on the predetermined energy reserve and on how much additional balancing energy has recently been fed in.

An energy reserve is preferably determined for the wind power installation or for the wind farm, which energy reserve indicates an amount of energy that can be fed into the electrical supply grid in addition to the basic electrical power. The amount of balancing energy is then determined depending on said energy reserve. The amount of balancing energy is thus determined at least depending on the power indicator and depending on the energy reserve. For example, the amount of balancing energy can be determined by means of a dependency function of the power indicator and additionally a weighting factor can take the energy reserve into account. For example, a ratio between the present energy reserve and the maximum energy reserve can be formed. Said factor is then by nature between the values of 1 and 0 and can therefore be incorporated in the determination of the amount of balancing energy depending on the power indicator as a factor that can assume a value of 0 to 1. If an amount of balancing energy is fed in in addition to the basic power, this leads to a reduction in the energy reserve and can therefore also lead to an immediate change in said weighting factor, to mention just one preferred embodiment of the implementation. Another preferred variant would be that the amount of balancing energy is determined initially depending on the power indicator and the energy reserve leads to a reduction in the value determined in the process as soon as the energy reserve undershoots a predetermined value, such as 50% of the maximum energy reserve, for example.

Otherwise, a value that results due to the fundamental properties of the wind power installation or of the wind farm can be used as such a maximum energy reserve. A value that indicates how much energy reserve is present at the moment in which a first measure for supporting the grid is introduced, which measure requires a positive amount of balancing energy, can also be used as the maximum energy reserve or alternatively as the initial energy reserve. Explanations that refer to a maximum energy reserve also apply analogously to the initial energy reserve explained here.

According to one embodiment, it is proposed that the amount of balancing energy is determined for a reference time interval and the infeed of the basic power is changed, that is to say is increased or reduced according to the sign, by said amount of balancing energy in said reference time interval. Such a reference time interval can be, for example, one second or half a second or 200 ms, to name just a few preferred examples. An amount of balancing energy is therefore calculated and fed in in said reference time interval or is fed in as soon as possible in a time interval that is as great as the reference time interval.

This can result in a respectively determined amount of balancing energy being able to be fed in, that is to say additionally fed in, in a targeted manner for a short period. As a result, in particular, said energy can also be fed in for a short period for support. Furthermore, an amount of balancing energy can be determined and fed in anew subsequently, that is to say for the next reference time interval. As a result, the behavior of said wind power installation or of the wind farm can also be approximated to the synchronous generator coupled directly to the grid. In particular, here, an amount of energy that is dependent on the situation of the electrical supply grid is respectively fed in and, on the other hand, said situation in the electrical supply grid is taken into account anew continuously, namely at each reference time interval. Also, the energy reserve that is still present for support is or can be taken in account even during the determination of the amount of balancing energy.

It is preferably proposed to provide asymmetrical periods and/or different lengths of periods for the reference interval and the infeed interval. For example, it is proposed to calculate an amount of balancing energy every second but to always feed it in for longer periods, for example 3 s. The longer time can be the time up to the reaction of the regulating power or can orient itself thereon. As a result, energy packets would be calculated and fed in and said energy packets would be added together, possibly even superposed.

According to a further embodiment, it is proposed that the amount of balancing energy is determined depending on the power indicator so that said amount of balancing energy is positive, that is to say the infeed of the basic power increases, when the power balance reduces and is negative. It is thus proposed that the absolute value of the power balance in the electrical supply grid is observed during the determination of the amount of balancing energy and how said value develops is also observed. If the power balance reduces and if it is negative, that is to say if it increases according to the magnitude, a positive balancing amount is determined, assuming, of course, that an energy reserve, which can also be referred to synonymously as reserve energy, is present for this at all. A predetermined lower limit value, which first has to be undershot, is preferably assumed, in order that such an amount of balancing energy is determined. According to one embodiment, in the case of minimal deviations of the power balance from the ideal value of 0, an amount of balancing energy is therefore not yet initially determined. According to one embodiment, the reaction in the case of a power indicator or a power balance close to 0 can be disproportionately smaller. This can result in virtually or almost no additional infeed taking place in the case of small deviations. The ratio between the amount of balancing energy and the power indicator can preferably be established by means of a PT2 behavior or can be described as a behavior that corresponds to a step response of a PT2 element.

A proposal for calculating a negative amount of balancing energy is proposed analogously, namely in such a way that the amount of balancing energy is determined depending on the power indicator so that said amount of balancing energy is negative, that is to say the infeed of the basic power reduces, when the power balance increases and is positive. According to one embodiment, it is also proposed here that said calculation takes place only when the power balance has exceeded a predetermined upper limit value. The reduction of the infeed of the basic power can in this case, and also generally for each situation described here, also involve the case that the wind power installation or the wind farm takes up an amount of balancing energy or a part thereof from the electrical supply grid. Such an amount of energy taken up can be stored in the wind power installation or the wind farm or can be destroyed by means of what are known as chopper resistors or can also be infeed power that is cut back by means of the power regulation.

According to one refinement, it is proposed that the amount of balancing energy is dependent on the power indicator with a dependency function and that the dependency function is variable. By feeding an amount of balancing energy into the electrical supply grid depending on a power indicator and hence depending on the power balance in the electrical supply grid, grid support can be performed in accordance with the behavior of a synchronous generator coupled directly to the electrical supply grid. By using a dependency function that is variable, a higher degree of flexibility can be achieved, however. In particular, such a method can be adapted in a simple and rapid manner to changed circumstances in the electrical supply grid. As a result, specifications of a grid operator can also be taken into account.

In addition or alternatively, it is proposed that the dependency function depends on the grid connection point. This can relate to the technical design of said grid connection point, particularly its capacities and skills in making the additional infeed of energy possible. However, particularly the position of the grid connection point in the electrical supply grid, particularly with respect to the topology of the electrical supply grid, can also be taken into account as a result. For example, it is possible to take into account here whether a grid connection point is arranged in a particularly central or decentral manner in the electrical supply grid. Empirical values or performed measurements or other examinations of the electrical supply grid can also give an indication of the behavior of the electrical supply grid. For example, in this case, oscillating behavior of the electrical supply grid can be discovered. By taking such oscillating behavior into account, it can be advantageous to provide different dependency functions for different positions of grid connection points in such an electrical supply grid. In particular, it is possible, by means of a dependency function, to ascertain or influence whether a particularly large amount of balancing energy or rather a small amount of balancing energy is determined depending on the power balance. A larger or smaller amount of balancing energy can thus be provided for an equal value of a power balance depending on the selection or adjustment of the dependency function.

A property of the grid connection point is also its short-circuit current ratio. In particular, it is proposed that the dependency function is selected or adjusted so that a larger amount of balancing energy is determined, the greater the short-circuit current ratio at the grid connection point. Said short-circuit current ratio is the ratio of the short-circuit power to the connection power. Short-circuit power is understood here as that power that the relevant supply grid can provide at the observed grid connection point, at which the wind power installation or the wind farm is intended to be connected, when a short circuit arises there. The connection power is the connection power of the wind power installation that is to be connected or of the wind farm that is to be connected, that is to say, in particular, the nominal power of the generator or generators that is or are to be connected.

Such a dependency function is preferably non-linear so that a proportionality between the power balance and the amount of balancing energy can be prevented. In the case of a suitable selection of the non-linear dependency function, this can counteract oscillations in the electrical supply grid. For example, such a non-linear dependency function can be selected so that the amount of balancing energy always increases more slowly, the greater the power balance. This can prevent countermeasures with ever larger amounts of balancing energy being taken in the case of an arising oscillation, which could actually lead to excitation of the oscillation.

Alternatively or in addition, it is preferably proposed that the dependency function is formed so that, for determining positive amounts of balancing energy, said dependency function behaves differently or is provided with a different correlation than when it leads to determination of negative amounts of balancing energy. This can also counteract a possible occurrence of an oscillation in the electrical supply grid or can take account of the different behavior of energy supply grids in the case of overfeeding and underfeeding.

The dependency function can otherwise also depend on the grid connection point and also be variable. For example, a basic function of the dependency function can be provided, which basic function is dependent on the grid connection point, and also a weighting factor in order to change the dependency function.

The dependency function can depend on a system property of the electrical supply grid. This includes, for example, what total power can be fed in by the connected energy generators, which can also be referred to synonymously as infeeders or generators. This can also include taking into account only energy generators within a defined perimeter of, for example, a few hundred kilometers, in particular 200 km or 500 km. The type of energy generators present and, in addition or alternatively, the type of consumers present can also be taken into account here. For this, an average value can be formed, for example over the inductive component of all of the consumers at the total impedance of all of the consumers. There may also be provision for only dominant consumers to be observed, that is to say, for example, consumers that decrease at least a minimum proportion of the consumed power of all of the consumers, such as 5% or 10%, for example.

The same also applies for taking into account the infeeders, for which there may also be provision for only the most dominant to be observed. For taking the infeeders into account, there may also be provision for a characteristic to be created and for the dependency function to be selected depending thereon, for example by means of a predetermined table. Such a characteristic can contain whether the grid rather has decentral infeeders or generators, such as wind power installations or photovoltaic installations, or instead contains conventional power plants, such as coal power plants or nuclear power plants. It is also possible to take into account how many system services the connected generators can provide. For this, it is proposed that each connected generator or infeeder indicates a power value or an energy value that it can provide within a predetermined support interval, which can be 5 s or 10 s, for example. Such an indication can also be variable during operation.

According to one embodiment, an interconnection situation or switch positions in the electrical supply grid are taken into account as system property. In particular, the operator of the electrical supply grid can influence the grid topology by means of corresponding switch positions. It is therefore possible to change a spur line in a mesh or to switch or dismantle a ring topology, for example by way of appropriate switch positions. Disconnection or additional connection of a parallel line is also considered. For example, to mention a specific example, the isolation of a high-voltage line over a river in order that, as an exception, a very large ship can pass, can lead to such a change in the grid topology. In order to better take such cases into account, according to one embodiment, it is therefore proposed to change, adjust or select the dependency function depending on an interconnection situation or switch positions in the electrical supply grid. The interconnection situation or switch positions in the electrical supply grid can in this case be measured or they are disclosed by the grid operator.

The dependency function can be adjusted or selected depending thereon. If these values change, as has been indicated above, the dependency function can also be changed accordingly.

In addition or alternatively, all of this can take place depending on a system behavior of the electrical supply grid. Such a system behavior is, in particular, the tendency of the electrical supply grid to oscillate in the case of fluctuations of the power balance. In this case, the system behavior can correlate to the system properties mentioned above.

In addition or alternatively, the dependency function can be changed, adjusted or selected depending on at least one system state of the electrical supply grid. A system state is an actual state of the supply grid and relates, in particular, to the frequency in the electrical supply grid as well as the voltage in the electrical supply grid. However, other system states can also be considered, such as the presence or the size of harmonics of the voltage or else electric currents. The term system state is to be understood here in terms of regulation. In particular, said system state does not relate to physical properties or other properties of the electrical supply grid, such as the size of a transformer, of a line or the impedance of the grid or of a grid section, for example.

In addition or alternatively, it is proposed that the dependency function is changed, adjusted or selected depending on at least one further dependency function of a further wind power installation or of a further wind farm. In particular, it is proposed here that said wind power installation or the wind farm communicates with the further wind power installation or the further wind farm and exchanges at least these pieces of information, but preferably exchanges further more diverse pieces of information. For example, there may also be provision here for there to be provision for said different dependency functions to be selected for an example of two identical wind farms particularly so that one wind farm determines a larger amount of balancing energy in the case of an identical power indicator than the other wind farm. This can also counteract surging and prevents, in particular, said two wind farms from providing grid support with respect to one another.

In addition or alternatively, it is proposed that an external specification be taken into account, in particular an external specification of the operator of the electrical supply grid. As a result, an option to control the respective wind power installations or wind farms with respect to their system services, in particular with respect to their grid support property, can be made available to the operator of the electrical supply grid, who is also referred to simply as grid operator. Said grid operator can change or adjust said behavior patterns or select them from various options. This can also be adapted, for example, depending on the empirical knowledge obtained.

According to a further embodiment, it is proposed that the dependency function is dependent on an event in the electrical supply grid, in particular is dependent on a disconnection or reconnection of a grid section. If a part of the electrical supply grid is disconnected, for example, as a compulsory protective function or protective reaction, this can lead to the power balance also suddenly changing both in the disconnected part and in the other part. If, for example, a grid section is disconnected, at which grid section a lot of power is consumed in a manner above average and in which grid section possibly only consumers are connected, disconnection regularly leads to a positive power balance suddenly prevailing in the remaining electrical supply grid, that is to say there is a sudden need to counteract an excess of power. In this case, it can be particularly advantageous to counteract said excess of power to the greatest extent near to the point at which said partial grid has been disconnected. If it can be predicted at least at short notice that a disconnection of this kind is impending, the dependency function of a wind farm close to such a disconnection point can accordingly be changed to a particularly strong dependency.

The same can apply when partial grids are intended to be reconnected. Wind farms that are further away from said disconnection point can select a weaker dependency function in order to take counter measures in this situation of a tendency of the grid toward instability as well.

The power indicator is preferably determined from the grid frequency, a time derivative of the grid frequency, a grid voltage, a measured power difference, a model frequency modeled on the grid frequency and/or a phase angle between a phase of the grid voltage and of the model frequency. A plurality of variables can also be combined to determine the power indicator.

According to one embodiment, it is proposed that the power factor is also determined depending on the grid impedance. In particular, at least one of the aforementioned variables, in particular the grid frequency and/or the time derivative thereof, is used to determine the power factor and additionally takes the grid impedance into account. A value measured at a grid connection point can be used as the grid impedance. It is also considered that the grid impedance is known as a value and is provided by the grid operator, for example.

The grid frequency of the electrical supply grid or the time derivative of said grid frequency or a combination of both is preferably used as the power indicator. This assumes, of course, that the electrical supply grid has an AC voltage or is an AC voltage grid. An amount of balancing energy is then determined in each case depending on said grid frequency as the power indicator and, in this case, for example, the amount of balancing energy can be determined to be greater, the greater an undershooting of the grid frequency, that is to say of the present frequency, compared to the nominal frequency or to a lower limit value of a tolerance range around the grid frequency. However, other considerations of the grid frequency as the power indicator can also be expedient, such as the consideration of a change in the grid frequency. The power indicator can then nevertheless correspond to the grid frequency or be derived therefrom. If said power indicator corresponds to the grid frequency, changes in the power indicator and hence changes in the grid frequency can be taken into account for the determination of the amount of balancing energy. The same can be achieved when the power indicator already corresponds to the change in the grid frequency.

Particularly in small grids, it is considered to measure the power difference and to use it directly as the power indicator. As a result, the power balance can be detected and taken into account directly, which is advantageous, but can be complicated for particularly large grids or particularly complex grids.

Instead of measuring the grid frequency directly, a model frequency modeled on the grid frequency can be taken into account. Such a model frequency can be identified by a state observer, for example.

In addition or alternatively, it is proposed to take into account a phase angle between a phase or phase position of the grid voltage and a phase or phase position of the model frequency. As a result, a change in the grid frequency, which leads to an increase in the phase angle, can be taken into account particularly well.

According to one embodiment, it is proposed that the amount of balancing energy is calculated from a product of the change in the power indicator and a first adjustable location factor. In the simplest case, the amount of balancing energy corresponds to said product. However, other influencing variables can be taken into account, such as a total available amount of energy, for example. In any case, for the purpose of calculation, that is to say for the purpose of determining the amount of balancing energy, it is proposed to multiply the change in the power indicator by the first location factor. As a result, the amount of balancing energy can be calculated depending on the change in the power indicator, that is to say a change in frequency, for example.

A location-dependent consideration of the relevant grid connection point can be incorporated by means of said first location factor. For example, for a first wind power installation or a first wind farm, which feed into the electrical supply grid by means of a first grid connection point, the value 1 can thus be used as the first location factor. In another wind power installation or another wind farm, which otherwise have the same requirements as the first wind power installation or the first wind farm but feed into the electrical supply grid by means of another grid connection point, which is arranged, in particular, at another location in the electrical supply grid, the value 0.5 can be used as the first location factor, for example. As a result, weighting can be performed by means of said location factor and, as a result, the determination of the amount of balancing energy can be influenced depending on the grid connection point. However, the first location factor can also be variable in order to thereby be able to incorporate other variables too as the location of the grid connection point or in order to thereby be able to react dynamically.

In addition or alternatively, according to a further embodiment, it is proposed that the amount of balancing energy is calculated from a product of the power indicator and a second adjustable location factor. The power indicator is accordingly taken as a basis and multiplied by a location factor. In this case, too, as in the embodiment in which the change in the power indicator is used, still further influencing variables can also be incorporated. In the simplest case, however, the amount of balancing energy is calculated directly from the product of the power indicator and the second location factor.

However, when further influencing variables are incorporated, it is also possible to carry out a combination with the embodiment described above in which the amount of balancing energy is determined, inter alia, from the change in the power indicator. In this case, the first and the second location factor can be incorporated. In theory, the use of just one location factor could suffice and the first and second location factor could be identical. This would also be considered in principle for the two individual variants without combination, that is to say when just the power indicator or just the change thereof is considered. In practical terms, however, the location factor, both the first and the second location factor, can contain a standardization. In particular, the described change in the power indicator relates to a time change of the power indicator so that even another physical unit in comparison to the absolute value of the power indicator results. This can be taken into account by means of the respective location factor. Size adaptation for the different situations described can also jointly be taken into account by means of the respective location factor. Alternatively, the frequency and the change in frequency can be jointly incorporated in the power indicator so that the power indicator even contains both and the frequency and change in frequency are taken into account by using the power indicator.

A further preferred embodiment is characterized in that
the wind power installation or the wind farm has at least one infeed device for feeding the electrical power into the electrical supply grid and the infeed device has at least one operating range, which is to be satisfied in order to satisfy installation protection or prescribed limit values, wherein
to feed in the amount of balancing energy, the operating range can be departed for a predetermined balancing time interval, in particular at least an upper limit value of the operating range up to a predetermined exceedance value is exceeded, when the infeed of the basic power is increased.

The wind power installation used or the wind farm used therefore have at least one infeed apparatus, which in turn has at least one operating range. In particular, when a wind power installation is used, an individual infeed apparatus, in particular an inverter including an output inductor, can be provided. In the case of a wind farm, a plurality of such infeed apparatuses can be used. However, it is also considered that the wind farm collects the energy from its wind power installations in some other way and uses a central infeed apparatus, to explain a further variant.

Said at least one infeed apparatus therefore has at least one operating range, which is to be satisfied in order to satisfy installation protection or prescribed limit values. In particular, the maximum current to be fed in can form an upper limit and, as a result, define an operating range with respect to the current to be fed in. Another operating range can be given by a voltage range that is to be used.

However, it is now proposed that the operating range is departed, as an exception, in order to feed in the balancing energy. This is also provided only for a predetermined balancing time interval. This is based on the knowledge that operating ranges, particularly voltage, current or power limits, can lead, in particular, to heat damage. Exceeding such limits can thus result in overheating. However, it has been identified that excessive increases in temperature arising here that ultimately lead to destruction or at least aging have a certain time constant and temporary excessive increases can therefore be accepted. Since the defined temporary infeed of a predetermined amount of balancing energy is provided here, it is also possible to satisfy the fact that this only occurs very temporarily, in particular, through the use of a short reference time interval despite exceedance of limit values. It is possible to prevent an excessive temperature despite excessive infeed, in particular, due to selection of a short reference time interval.

An upper limit value of the operating range that may be exceeded up to a predetermined exceedance value when the infeed of the basic power is increased is preferably provided. By stipulating said predetermined exceedance value, particularly in connection with the provided exceedance time or maximum exceedance time, the exceedance and, in particular, also the resulting effect can be kept within limits in a targeted manner. For example, the exceedance of the nominal rotational speed corresponds to the exceedance of a limit. There is therefore more energy available in the rotor.

According to a preferred refinement, it is proposed that rotational energy of the wind power installation is used to feed in the amount of balancing energy when the infeed of the basic power is increased. That is to say, when more energy has to be fed in than the wind power installation is presently generating, rotational energy, particularly from the aerodynamic, but also from the electrodynamic, rotor of the wind power installation can be used. It could also lead to the rotational speed of the rotor decreasing as a result. However, this is accepted. By determining the balancing energy that is additionally fed in here, the energy that is drawn here from the rotation is also, however, clearly specified and hence able to be controlled. The determination of the amount of balancing energy can also accordingly take place depending on the rotational speed of the rotor of the wind power installation. In this case, the rotor of the wind power installation basically means the aerodynamic rotor and the electrodynamic rotor can in this case be referred to as armature for the purpose of better distinction. However, the rotational speeds of the armature and the rotor are equal in the case of a driveless wind power installation and the two rotational speeds can be readily converted into one another in the case of a drive system.

In addition or alternatively, it is proposed that energy is stored in the wind power installation as rotational energy when the infeed of the basic load is reduced, that is to say when less energy is fed in or even drawn from the electrical supply grid. Particularly for the case that merely less energy is fed into the electrical supply grid but a positive power is still fed in, such a use of the rotor as an energy store can be realized simply by virtue of the fact that less energy is accordingly also drawn from the rotor or from the movement of the rotor than is input therein by the wind. The rotational energy can then be stored simply by virtue of the fact that a rotational speed setpoint value is increased accordingly.

Alternatively or in addition, a power cutback of the wind power installation is preferably provided when the infeed of the basic power is reduced. It is therefore proposed to change the operating point of the wind power installation so that it generates less energy. This can be done, for example, by pitching the rotor blades out of the wind.

According to a preferred refinement, it is proposed that
the wind power installation or at least one of the wind power installations of the wind farm has a generator, which is operated at a generator rotational speed,
an expected value, which indicates whether a change in the power balance is to be expected, is determined, and
the rotational speed is changed depending on the expected value when said expected value indicates that a change in the power balance is to be expected.

It is therefore proposed to check whether a change in the power balance is to be expected. A change in the power balance may be expected, for example, depending on a time of day on account of empirical values when, in particular, a lot of consumers or powerful consumers are connected or disconnected empirically. A power balance can also be expected when it is announced by a large consumer. Said power balance can also be expected when, in particular, the proportion of power generated by photovoltaics changes on account of the change from day to night or vice versa. A weather forecast, in particular a wind forecast, is preferably evaluated and a change in the wind power that is to be fed in and to be expected is identified therefrom. An expected value for a power balance can also be derived therefrom. Further events may be maximum power gradients, which can arise, for example, during a solar eclipse, large sporting events that are followed by lots of people, Christmas and New Year's Eve.

It is also considered that particularly large consumers transmit a message to the grid operator or another control point, which message is used to announce a change in said large consumer. A planned disconnection or reconnection of a partial grid of the electrical supply grid can also allow a change in the power balance to be expected. An expected value is accordingly determined and it is proposed that the rotational speed is changed depending on said expected value when it indicates that a change in the power balance is to be expected. In particular, it is proposed that the rotational speed is increased when it is to be expected that the power balance is negative in order, as a result, to make more rotational energy available to which it is possible to resort for the determination and then infeed of the amount of balancing energy.

As a further aspect, it is considered to depart the permitted acoustic limits temporarily due to an excessive rotational speed. On average, the installation can in this case still always satisfy the limit values but more rotational speed can be permitted temporarily for support, which leads to more noise but only temporarily.

Provided is a wind power installation for feeding electrical power into an electrical supply grid at a grid connection point and said wind power installation comprises
a monitoring means for monitoring a power indicator that is representative of a power balance in the electrical supply grid, wherein the power balance indicates a differential power as the difference between
power fed into the electrical supply grid by energy generators and
power drawn from the electrical supply grid by consumers, wherein the power balance is positive when more power is fed in than drawn,
a determination means for determining an amount of balancing energy depending on the power indicator,
an infeed apparatus for feeding the electrical power into the electrical supply grid at the grid connection point,
a control apparatus for controlling the infeed apparatus so that
the infeed apparatus feeds in a basic electrical power depending on the available wind power and that
the infeed apparatus changes the infeed of the basic electrical power by the determined amount of balancing energy.

The monitoring means therefore monitors the power indicator that is representative of the power balance. The power balance indicates a differential power as the difference between the power fed into the electrical supply grid and the power drawn from the electrical supply grid. Said power balance is also defined here as has already been explained above in connection with at least one embodiment of the method for feeding in electrical power.

The determination means then determines an amount of balancing energy depending on the power indicator. The determination means can be a computation unit having a microprocessor, for example. The determination means can also be part of a control apparatus (explained in more detail below) for controlling an infeed apparatus. The infeed apparatus, which can be formed, for example, as an inverter with a downstream inductor, is therefore used to feed the electrical power into the electrical supply grid at the grid connection point and is controlled by the control apparatus. The control apparatus in this case controls the infeed apparatus so that a basic electrical power is fed in depending on the available wind power and the amount of balancing energy determined by the determination means is fed in in addition to the basic electrical power. If said amount of balancing energy has been determined with a negative value, the infeed of the basic power is reduced accordingly.

The proposed wind power installation is preferably characterized in that it performs at least one method according to one of the embodiments described above.

The wind power installation preferably has a reserve energy store in which the energy reserve or a part thereof can be stored. For example, the energy reserve can thus be stored partly in the rotation of the aerodynamic rotor and/or of the armature of the wind power installation and another part can be stored in said reserve energy store in order to be able to provide more balancing energy as a result. The reserve energy store can be provided, for example, as a battery store or as a flywheel store or as a combination of both.

The reserve energy store is preferably provided as an external energy store with respect to the wind power installation. The energy store can be provided, for example, in an additional housing or building outside of the wind power installation. However, it can also be provided externally with respect to the infeed apparatus, that is to say, in particular, one or more inverters. It is therefore not a part of the inverter and is, in particular, provided in addition to a DC voltage link circuit of an inverter. In particular, it has a multiple of, for example at least five times or at least ten times, the storage capacity of a DC voltage link circuit of a used inverter arrangement.

According to one embodiment, it is proposed that the wind power installation is characterized in that
the control apparatus has a location factor block for providing a first and/or second location factor, wherein the location factor block has an input at which a variable that influences the location factor can be input and wherein
the amount of balancing energy is calculated from a product of the change in the power indicator and the first location factor or in that, in addition or alternatively,
the amount of balancing energy is calculated from a product of the power indicator and the second location factor.

The control apparatus therefore has a location factor block, which can provide a first or second location factor or both of said location factors. For this, said location factor block has an input at which in each case at least one variable that influences the location factor can be input. In the simplest case, a respective value that is proportional to the location factor is input. In principle, the location factor can also be input directly. However, in each case, a weighting factor that can be in the range of from 0 to 1, for example, is preferably input in order to link said weighting factor with a function, in the simplest case to multiply it by a further value, in order to obtain the location factor as a result. In the example shown, the input of the weighting factor with the size 1 would lead to the maximum location factor resulting, whereas with the input of a value of 0.5, for example, a location factor with half the size of the maximum location factor would result.

Said location factor or said location factors are then provided, namely output, in particular, for further calculation. The amount of balancing energy can then be calculated from said location factors, namely either from a product of the change in the power indicator and the first location factor or, in addition or alternatively, from the product of the power indicator and the second location factor. A combination is also considered. The amount of balancing energy and the calculation thereof can therefore be influenced thereby. Said influencing can also be performed externally by virtue of the variable that influences the location factor being input at the input of the location factor block, for example by the grid operator or by a farm controller when the wind power installation is arranged in a wind farm.

Provided is a wind farm, which has a plurality of wind power installations for feeding electrical power into an electrical supply grid at a grid connection point. Said wind farm comprises
a farm monitoring means for monitoring a power indicator that is representative of a power balance in the electrical supply grid, wherein the power balance indicates a differential power as the difference between
power fed into the electrical supply grid by energy generators and
power drawn from the electrical supply grid by consumers, wherein the power balance is positive when more power is fed in than drawn,
a farm determination means for determining an amount of balancing energy depending on the power indicator,
a farm control apparatus for controlling the wind power installations so that
the wind power installations feed in a basic electrical power depending on the available wind power and that
the wind power installations change the infeed of the basic electrical power by the determined amount of balancing energy.

Such a wind farm can therefore perform grid support through specific determination and infeed of an amount of balancing energy, similarly to as described above with respect to the wind power installation. By using a wind farm, a substantially larger amount of balancing energy can be provided and fed in here, and the infeed can be reduced by said amount of balancing energy, than would be possible using a single wind power installation of the wind farm.

To this end, the wind farm has a farm determination means, which operates similarly to the determination means (described above) of the wind power installation and determines an amount of balancing energy depending on the power indicator. The farm determination means in this case takes the size, property and also the operating state of the wind power installations in the wind farm into account. For the purpose of implementation, the farm control apparatus is then provided, which controls the wind power installations accordingly, namely so that the determined amount of balancing energy is fed in in addition to the basic electrical power or, when said amount of balancing energy is negative, the basic power is reduced accordingly. In this case, the farm control apparatus does not control every detail of the wind power installations but instead preferably prescribes corresponding setpoint values for the infeed, particularly power setpoint values. The specific implementation can be carried out by the wind power installations.

The prescription of the amount of balancing energy is accordingly to be implemented onto the wind power installations. This can be done, for example, by a percentage value, which the farm control apparatus can output, for example, as a value and which then leads for each of the wind power installations to a corresponding percentage value of the amount of balancing energy of the specific wind power installation, for example based on a maximum amount of balancing energy of the respective wind power installation. Reference can also be made to an arbitrary amount of reference energy, for example.

The wind farm preferably has wind power installations according to at least one of the embodiments described above. In this case, the farm monitoring means can be formed by a monitoring means of the wind power installation. It is then also possible to omit the farm determination means and/or the farm control apparatus or to adapt them to the wind power installations. In particular, it is proposed that the farm control apparatus can influence a location factor of the wind power installations, in particular said farm control apparatus accesses the input of the location factor block and inputs an appropriate variable there in order to influence the location factor.

For the wind farm, it is preferably proposed that a farm energy store is provided to store additional energy for providing the amount of balancing energy or a part thereof. It is therefore possible to provide another further storage apparatus, namely said farm energy store, in addition to the wind power installations of the wind farm. A farm infeed apparatus is also optionally provided, which for its part feeds energy from the farm energy store into the electrical supply grid, in particular independently of the wind power installations. For this, an additional inverter apparatus can be provided, for example. The infeed independently of the wind power installations uses its own farm infeed apparatus but is preferably coordinated with the infeed of the electrical power of the other wind power installations, particularly with the use of the farm control apparatus. As a result, support of the electrical supply grid can be improved by virtue of both additional energy for support being able to be provided by said farm energy store and infeed, which is independent of the wind power installations and thus easily expandable, and grid support being able to be provided.

The energy store can also be provided in the individual wind power installations and/or in the DC intermediate circuit of an inverter or a plurality of inverters.

When the determined amount of balancing energy is negative, there may also be provision to draw energy from the electrical supply grid and to feed it into the farm energy store. In the simplest case, the wind power installations can in this case continue to be operated unchanged. In such a case, the wind power installations can thus simply continue the infeed of the basic power without increasing or decreasing said basic power.

According to one embodiment, it is proposed that
the farm control apparatus has a location factor farm block for providing a first and/or second location factor, wherein the location factor farm block has an input at which a variable that influences the location factor can be input and wherein
the amount of balancing energy is calculated from a product of the change in the power indicator and the first location factor or in that, in addition or alternatively,
the amount of balancing energy is calculated from a product of the power indicator and the second location factor.

A wind farm can also be controlled or adapted externally hereby by means of changing one or more location factors. As a result, it is possible to change the location factor or the location factors and hence the amount of balancing energy externally, for example by way of a grid operator.

As a result, a high degree of flexibility of said grid support is achieved; this does not apply only for said wind farm but also for the wind power installations described and the methods described. In particular, it is possible to react directly to a change in the power balance because the respective amount of balancing energy is determined depending thereon. However, said dependence can also be influenced and hence the system behavior of the electrical supply grid can be influenced.

A further proposal is to provide controllable loads as a further form of realization in order to provide negative energy. For this purpose or in addition, it is proposed that a farm controller, namely a central controller of a wind farm, which can also be referred to as a wind farm controller, controls consumers in the distribution grid or in the electrical supply grid in order to reduce the consumption as required as a result. The power balance can be increased as a result.

BRIEF DESCRIPTION OF THE SEVERAL VIEWS OF THE DRAWINGS

The invention is now explained in more detail below on the basis of exemplary embodiments with reference to the accompanying figures.

DETAILED DESCRIPTION

Figure 1:
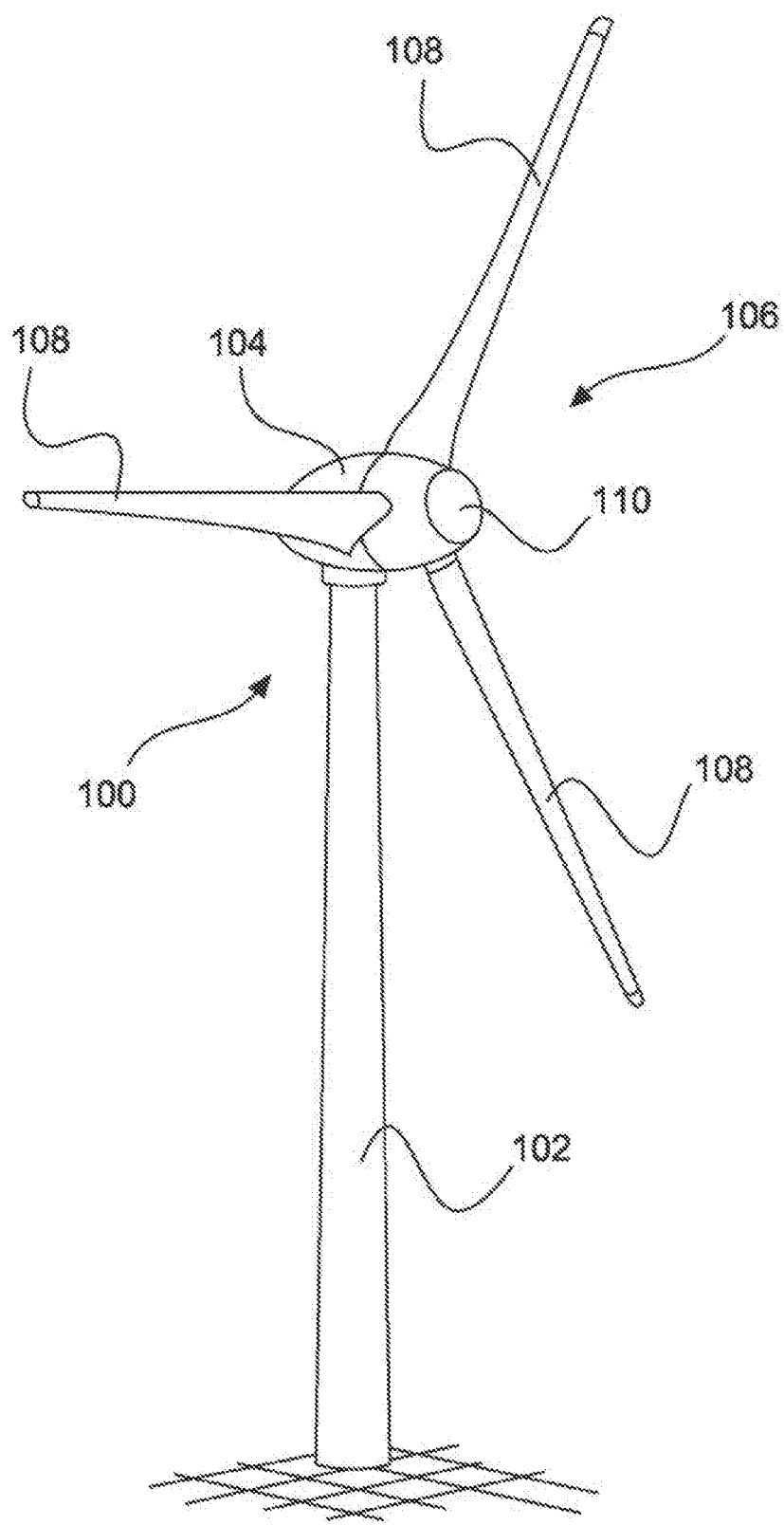
FIG. 1 shows a wind power installation in a perspective view.

FIG. 1 shows a wind power installation 100 with a tower 102 and a nacelle 104. Arranged on the nacelle 104 is a rotor 106 with three rotor blades 108 and a spinner 110. During operation, the rotor 106 is set in rotation by the wind and thereby drives a generator in the nacelle 104.

Figure 2:
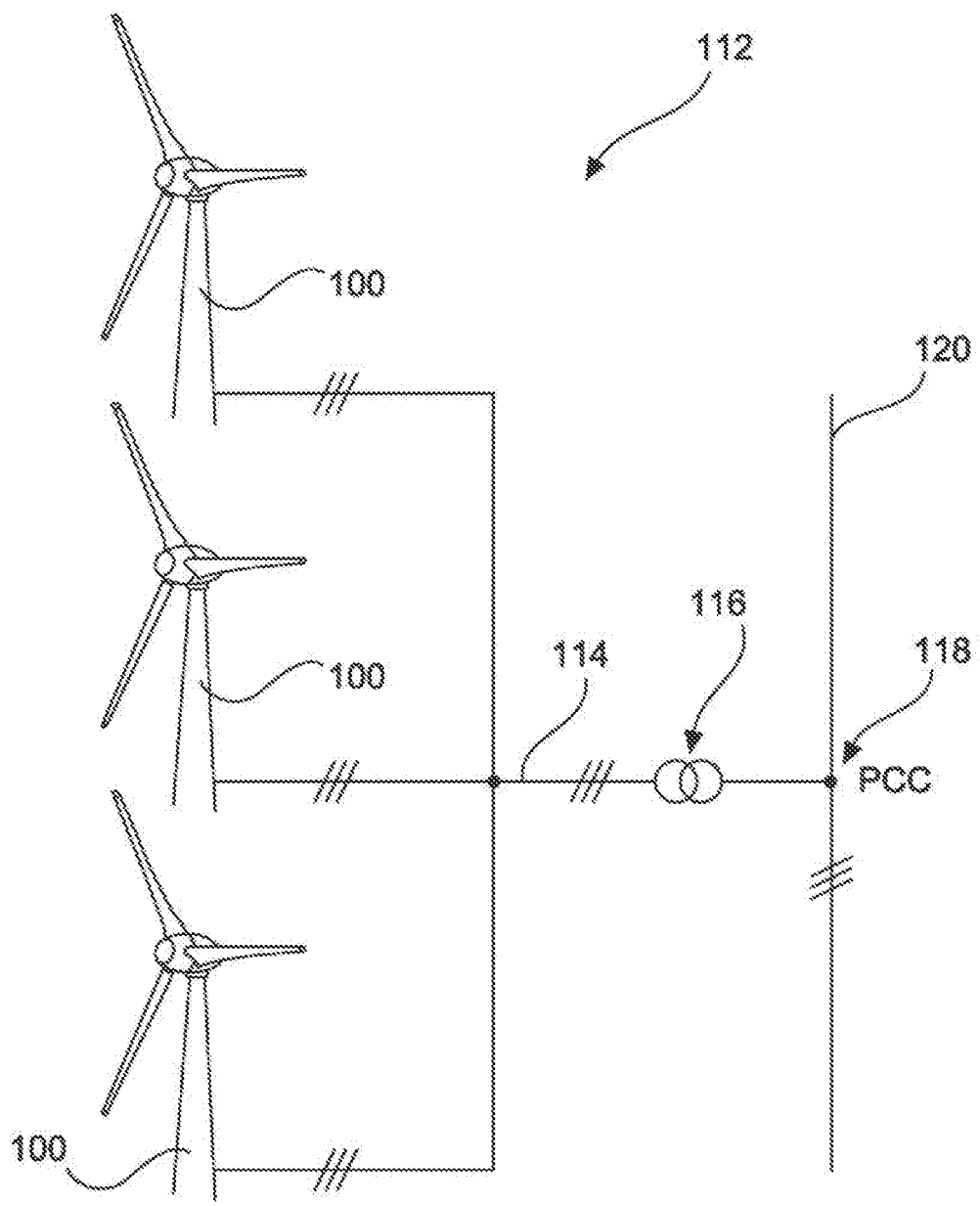
FIG. 2 schematically shows a wind farm.

FIG. 2 shows a wind farm 112 having, for example, three wind power installations 100, which may be identical or different. The three wind power installations 100 are thus representative of basically any desired number of wind power installations of a wind farm 112. The wind power installations 100 provide their power, namely, in particular, the generated current, via an electrical farm grid 114. In this case, the respectively generated currents or powers of the individual wind power installations 100 are added together and a transformer 116, which steps up the voltage in the farm, is usually provided in order to then feed into the supply grid 120 at the infeed point 118, which is also generally referred to as a PCC. FIG. 2 is only a simplified illustration of a wind farm 112, which does not show, for example, a control system, although a control system is present, of course. The farm grid 114 can also be designed differently, for example, wherein a transformer is also present, for example, at the output of each wind power installation 100, to mention just one other exemplary embodiment.

Figure 3:
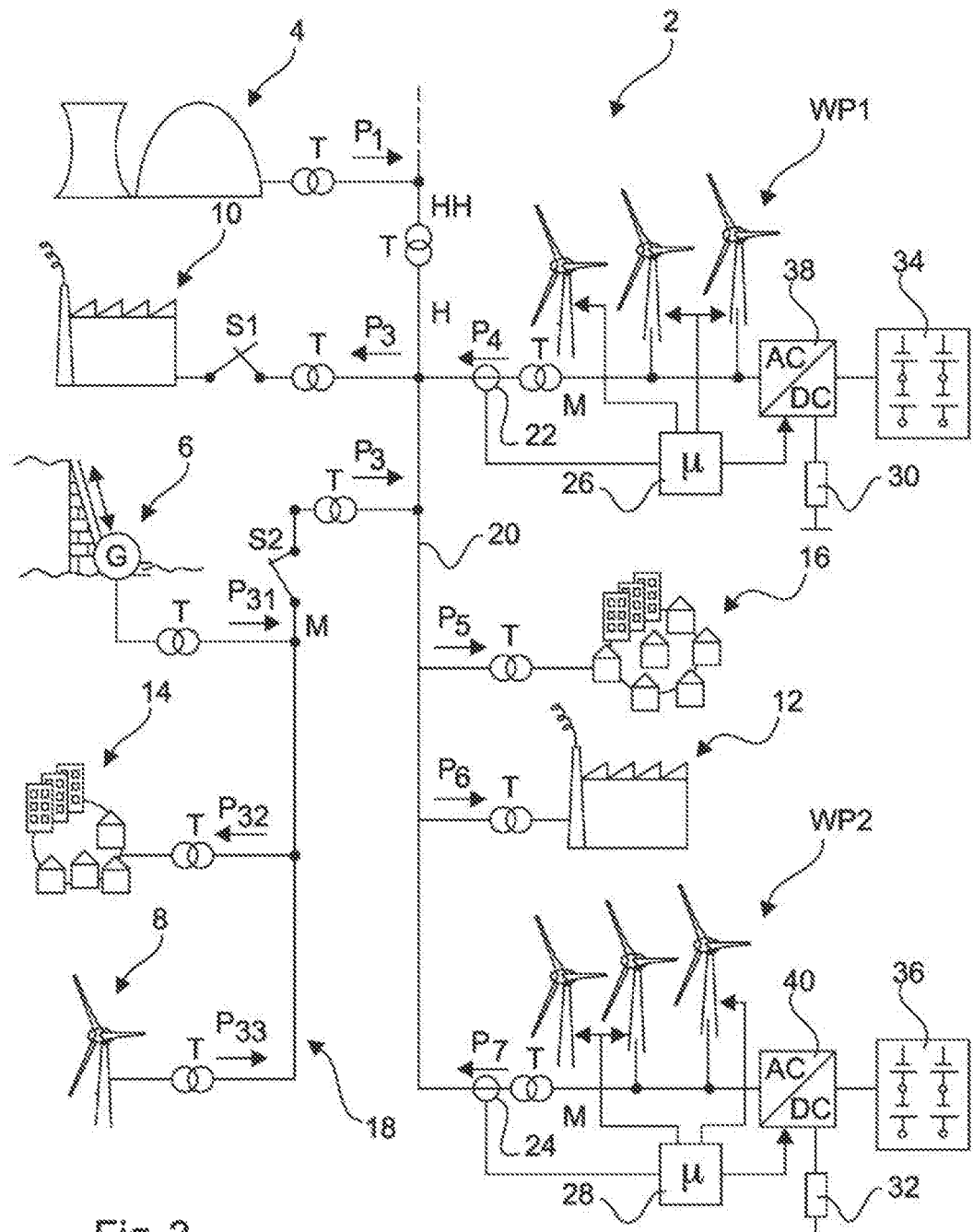
FIG. 3 shows a section of an electrical supply grid having some elements that influence the behavior of the electrical supply grid.

FIG. 3 shows a part of an electrical supply grid 2, which indicates different line sections for different voltage levels, namely for ultra-high voltage HH, high voltage H and medium voltage M. There are also low-voltage sections but these are not characterized further here. Part of the electrical supply grid is a large power plant 4, a hydroelectric power plant 6, a wind power installation 8, which corresponds to a wind power installation 100 according to FIG. 1 and FIG. 2, and a first wind farm WP1 and a second wind farm WP2. These are energy generators that feed into the electrical supply grid 2.

FIG. 3 illustrates a first factory 10 and a second factory 12 as well as a first town 14 and a second town 16 as consumers. Transformers T, which, although characterized by the same letter, are of course of different dimensions, are provided for different connections and also the connection between the ultra-high-voltage grid and the high-voltage grid.

For the purpose of illustration, provision is also made of a switch S1 for connection and isolation of the first factory 10, as well as a switch S2 for connection and isolation of the hydroelectric power plant 6, the first town 14 and the wind power installation 8. The hydroelectric power plant 6, the first town 14 and the wind power installation 8 are in this respect combined in a partial grid 18. The second switch S2 can therefore isolate the partial grid 18 from the remaining grid of the electrical supply grid 2 and reconnect it after isolation. In FIG. 3, it is initially assumed that the first and second switches are each closed and all of the energy generators and consumers shown are connected to the electrical supply grid and feed into said electrical supply grid or draw power therefrom.

Assuming that the energy generators and consumers shown in the electrical supply grid 2 in FIG. 3 are the only or only relevant energy generators and consumers, the following correlation results for the power balance $\Delta P$:

$$\Delta P = P_1 - P_2 + P_3 + P_4 - P_5 - P_6 + P_7$$

wherein the following holds true: $P_3 = P_{31} - P_{32} + P_{33}$

In this case, the powers $P_1$ to $P_7$ and $P_{31}$ to $P_{33}$ are each initially assumed to be positive according to their value and the arrows in FIG. 3 for the respective powers accordingly point away from the energy generator and toward the electrical supply grid 2 or toward the consumer and in this case away from the electrical supply grid. The powers of the energy generators are accordingly calculated as positive and those of the consumers as negative.

The power $P_3$ relates to the power fed by the partial grid 18 into the electrical supply grid 2 or the main line 20 thereof. Said value can also be negative, particularly when the hydroelectric power plant 6 and also the wind power installation 8 do not generate power or together generate less power than the first town 14 consumes, that is to say when the sum of $P_{31}$ and $P_{33}$ is lower than $P_{32}$.

If it is now initially assumed that the power balance $\Delta P=0$, that is to say the electrical supply grid 2 operates substantially in a stationary state, no support energy will be necessary. In particular, the wind power installation 8 and the two wind farms WP1 and WP2 could then operate in classic parallel grid operation, that is to say feed in exactly as much power as they can draw from the wind.

If, for example, the first factory 10 is now isolated from the grid, that is to say the first switch S1 is opened at least symbolically, the consumption power P2 of the first factory 10 could drop to zero and the power balance $\Delta P$ would then be positive. More power would thus be fed into the electrical supply grid 2 than the connected consumers draw. The wind farms WP1 and WP2 can detect said positive power balance, for example by way of a measuring sensor 22 or 24, and evaluate it in a farm control apparatus 26 or 28 and react appropriately thereto. The detection by means of the measuring sensors 22 or 24 can consist in the detection of the frequency, to mention just one example. However, the information can also be ascertained in a different way, including by virtue of such information being provided by the grid operator.

An amount of balancing energy can then be calculated in each case in the farm control apparatus 26 or 28, which amount of balancing energy would have to lead in both cases to a negative value for the balancing energy in the mentioned example of the excess of power in the electrical supply grid 2. The two wind farms WP1 and WP2 would accordingly now reduce the basic power, which they have fed in previously in the parallel grid operation mentioned, by the respectively calculated balancing energy. The power balance or a corresponding indicator therefor, which in this case has been called frequency, for example, would continue to be monitored. At the next time, for example at a next sampling time, an amount of balancing energy could accordingly be calculated again.

Depending on the size of the respectively calculated amount of balancing energy that would have to be fed in to a lesser extent in this case, an adaptation of the operation of the wind power installations can be sufficient or it could also be considered to destroy power or to convert it to heat by way of a thermal resistor, which can also be referred to as a chopper. This can take place, for example, in each wind power installation of the wind farm WP1 and WP2 or a separate chopper can be provided, which chopper is illustrated by way of example here as chopper 30 or 32. It is also considered to store said amount of balancing energy or a part thereof in the battery store 34 or 36. In this respect, it should be mentioned that, after a while, the activated regulating power from slower generators in the grid takes over or can at least partly take over the balancing of the energy balance. Even temporary support can therefore be sufficient.

For the sake of simplicity, for the purposes of illustration, it should be assumed that the two wind farms WP1 and WP2 are substantially identical, in particular are to have the same number of wind power installations with the same amount of nominal power. However, the wind farms WP1 and WP2 differ in terms of their position in the electrical supply grid. The first wind farm WP1 is connected close to the first factory 10 or to the point at which the first factory 10 feeds into the electrical supply grid or into the main line 20. In contrast, the second wind farm WP2 is further away from said point at which the first factory 10 feeds in than the first wind farm WP1. In particular, a grid-supporting measure of the respective wind farm WP1 and WP2 can therefore also have different effects. Worded somewhat more simply, the described disconnection of the first factory 10 has a more direct effect on the first wind farm WP1 than on the second wind farm WP2.

It is therefore proposed now that these different connection positions of the two wind farms WP1 and WP2 be taken into account in the grid support mechanism. In particular, it is proposed that the grid support measure of the first wind farm WP1 is selected to be more severe than that of the second wind farm WP2. In particular, it is proposed that the first wind farm WP1 provides more support energy or in this case draws more support energy from the excessively increased power than the second wind farm WP2. At the same time, however, the basic behavior of said grid support, that is to say the additional infeed of balancing energy or drawing of balancing energy, is preferably intended to proceed in the same way. For this, it is proposed that the amount of balancing energy respectively determined or calculated, that is to say in the first wind farm WP1 and in the second wind farm WP2, depends not only on the power balance or an indicator of a power balance but also on a piece of location information. In particular, said amount of balancing energy depends on a location factor, which takes into account said differences in the connection situation of the first wind farm WP1 on the one hand and of the second wind farm WP2 on the other hand.

In particular, a location factor that assumes a value between 0 and 1 or alternatively a value between 0.5 and 2 can be provided here. Said location factor could then assume the value 2 for the first wind farm WP1 and the value 0.5 for the second wind farm WP2. In this exemplary embodiment, a location factor with the value 1 could be set as a normal value or average value and the value would therefore be twice as large as said normal value or average value for the first wind farm WP1 and would be half as large for the second wind farm WP2. However, this is intended to serve purely for illustration. In any case, the amount of balancing energy here could respectively be determined equally quickly and with the same algorithm and hence also basically the same dynamics but with different variables for the first wind farm WP1 on the one hand and the second wind farm WP2 on the other hand. However, other considerations are also considered, such as providing other dynamics, for example.

The proposed solution to determine and additionally feed in an amount of balancing energy or to reduce the infeed by said amount is provided, in particular, for temporary grid support in the seconds range, that is to say for times below 10 s, in particular for times less than 5 s. Over time, longer-term measures can be started, which measures can achieve power balancing in the longer term so that ideally a power balance $\Delta P$ of 0 results again. One option of somewhat longer-term balancing is provided by the hydroelectric power plant 6, which is shown by way of example. However, other power plants are also considered, such as gas power plants, for example, to mention just one further example. For even longer times, large power plants can then also adapt their infed power.

If a balanced power balance is present again, that is to say the power balance $\Delta P$ is approximately 0 and the first factory 10 is then connected again, that is to say the symbolically drawn switch S1 is closed, while the first factory 10 is also withdrawing power, a situation in which the power balance $\Delta P$ is no longer balanced can result again. Particularly in this case shown, that is to say when the power P2 is suddenly drawn, the power balance $\Delta P$ is negative.

In particular, for temporary support, the two wind farms WP1 and WP2 can then feed in additional energy. An amount of balancing energy is in each case determined and fed in for this purpose. Said amount of balancing energy can be used partly or fully from rotational energy of the wind power installations of the wind farm. In addition or alternatively, energy can be taken from the battery store 34 or 36.

For this purpose, the inverter 38 or 40 can draw energy from the battery store 34 or 36 and convert said energy to alternating current and add said energy to the respective basic power of the wind farm WP1 or WP2 by means of the respective transformer T.

In this case, too, the amount of balancing energy is determined depending in each case on the power balance or an indicator of the power balance. In addition, it is also proposed here to provide an additional variation, namely this is proposed here depending on the position at which the respective wind farm WP1 and WP2 is connected to the electrical supply grid 2 or to the main line 20. In this case, the same as has been explained above for the case in which the power balance $\Delta P$ has become positive due to the switch S1 being opened applies analogously.

An additional factor here is that it is also proposed to take into account an energy reserve during the infeed of additional energy and hence during the determination or calculation of the amount of balancing energy. For the example illustrated according to FIG. 3, said energy reserve can be composed of rotational energy that can be drawn from the wind power installations and of the present energy that can be withdrawn that is present in the battery store 34 or 36. Particularly in the case of rotational energy, it should be noted that a certain reduction in the rotational speed, which is associated with the drawing of rotational energy, can be tolerated. However, it is not expedient to draw all of the rotational energy and hence bring the rotors to a standstill. In this case, it is accordingly not the entire rotational energy that is thus intended to be taken into account as the energy reserve or as a proportion of the energy reserve but only that rotation energy that can be drawn so that the wind power installation can continue to be operated in an expedient manner afterward.

One option for taking the energy reserve into account consists in monitoring the undershooting of a certain limit value, for example 10% or preferably 20% of the maximum possible energy reserve. As long as more energy reserve than said lower limit value is present, the amount of balancing energy can be calculated in each case without restriction thereby. If such a lower limit value is undershot, an algorithm for reducing the amount of balancing energy or for calculating same can be provided. This is just one example of taking account; it is also considered to provide an energy reserve as early as from the start in a calculation algorithm for calculating the amount of balancing energy.

By taking the energy reserve into account, it is not only very generally taken into account that a lot of energy is present only at the end but it is also possible here to influence the calculation of the amount of balancing energy in a targeted manner. Even in the case of support of the grid by physical properties of a directly coupled synchronous generator, which could be the case, for example, in the large power plant 4 illustrated symbolically, only as much support as rotational energy is present in the synchronous generator can also be performed. However, the limiting effect due to the present rotational energy cannot be influenced here. With the drawing of the rotational energy, the synchronous generator becomes slower and the frequency at which said directly coupled synchronous generator feeds in also changes accordingly. This also leads to a situation in which grid isolation or disconnection of a partial grid can occur when said generator rotational speed is reduced to a lower limit value. It is then suddenly no longer possible at all for said synchronous generator to feed in when its rotational speed falls below a minimum value. This firstly has the disadvantage that its support energy then immediately drops, including the power fed in up to then. However, it is also has the disadvantage that the power generated in the large power plant can suddenly no longer be output and has to be destroyed somehow. It is particularly problematic that, due to the overall drop in the grid frequency, all large power plants with synchronous generators can also often be isolated from the grid and the problem is exacerbated as a result.

Said problems can be prevented in the proposed solution that has been described here for the wind farms WP1 and WP2 but which in principle could also be carried out, for example, by the wind power installation 8. On the one hand, it is possible to control in a targeted manner how the supporting infeed is performed depending on the present energy reserve. On the other hand, however, the wind farm or the wind power installation can also continue to be operated at least using the basic power even when an energy reserve for additional infeed is no longer present. There is no need to carry out grid isolation; infeed can also continue at a non-optimum frequency and there is also not the problem that the wind farms or the wind power installations generate power that cannot be fed in.

A particularly flexible solution that is capable of adaptation is therefore provided for supporting the grid. The support properties of each wind power installation or of each wind farm can be adapted to the present situation. The adaptation to the specific location of the infeed, that is to say, in particular, the specific location of the respective grid connection point in the electrical supply grid, is in this case just one situation for which such an adaptation option is expedient. Another option is that, in particular, the grid operator of the electrical supply grid can better control the electrical supply grid by means of said adaptation capability. With flexible adaptation, prediction values can also be better taken into account, for example when a particularly large jump in the power balance is to be expected or when it is known that an energy generator, which can deliver support energy, is unavailable for whatever reason. Or it is possible to take into account, very generally, how much support energy is presently available in the grid, that is to say in the electrical supply grid.

Otherwise, FIG. 3 also provides an illustration of the disconnection of a partial grid, namely the disconnection of the partial grid 18. Such disconnection and accordingly also reconnection of said partial grid 18 can be performed by the symbolically drawn second switch S2. In this case, a power balance ΔP can result in the remaining electrical supply grid 2. This change in the power balance can thus result, in particular, at the main line 20. Since the partial grid 18 consists of energy generators and also a consumer, said partial grid could, at least in theory, also continue to function in this disconnected state. In this case, a change in the power balance in the partial grid 18 also results, of course, if the power $P_3$ should not=0 in the case of disconnection. This can also be balanced or at least partly balanced, inter alia, by the wind power installation 8 in the manner as has been described above basically for the wind farms WP1 and WP2. However, said partial grid 18 is also only an illustration and in reality would be significantly more complex.

Figure 4:
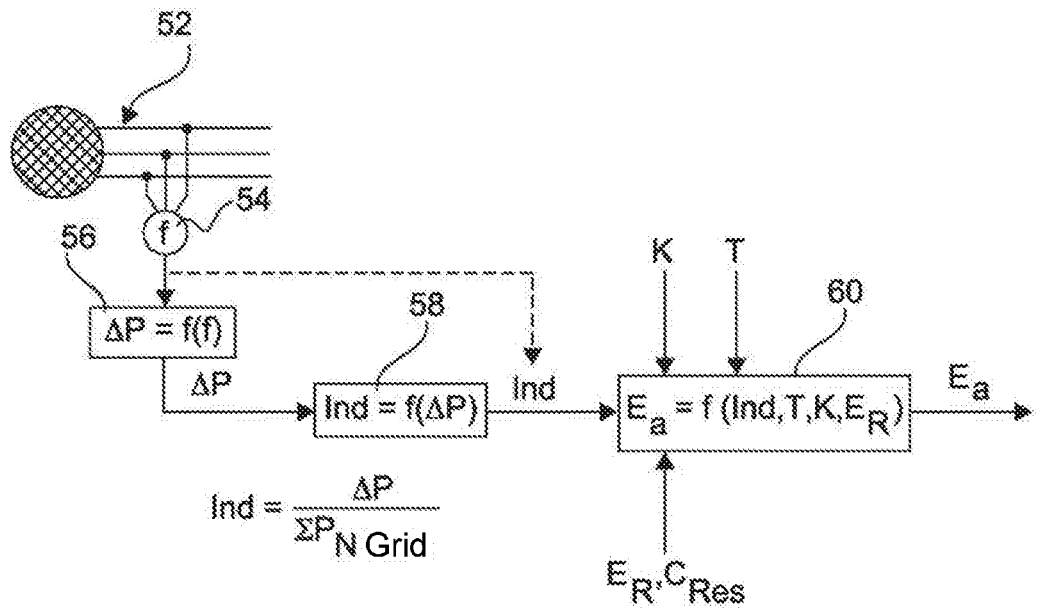
FIG. 4 illustrates options for determining an amount of balancing energy.

FIG. 4 now illustrates, in particular, the way in which an amount of balancing energy $E_a$ can be determined. To this end, it is proposed that measurement using a measurement means 54 is carried out at the electrical supply grid 52. Three-phase measurement is proposed purely symbolically there and, as an example, the measurement of a frequency f is illustrated by way of example. However, it will not usually be necessary to measure the frequency in all three phases in a three-phase grid. However, since this measurement using the measurement means 54 can also be illustrative of other measurements, such as current and/or power measurements, for example, this three-phase representation has been selected here.

The measurement means 54 thus detects, for example, a frequency f and inputs it into a balance determination block 56. Said balance determination block illustrates that the power balance ΔP is determined there as a function of the frequency, that is to say depending on the measurement variable input there. In this case, a relative determination is also considered, that is to say, for example, a percentage deviation, for example based on a maximum permissible deviation.

The power balance ΔP determined in this way is then input into the indicator determination block 58 and the indicator determination block 58 therefore determines the power indicator Ind as a function depending on the power balance ΔP. The result is therefore the power indicator Ind.

Alternatively, the power indicator Ind can also be determined directly from the frequency detected using the measurement means 54 or from a value detected there in some other way. In a simple case, even the output of the measurement means 54 can be used directly as the power indicator Ind, which is intended to be indicated by the dashed arrow.

The power indicator Ind is then input into the balancing energy determination block 60, which therefore functions as determination means for determining the amount of balancing energy depending on the power indicator. Said balancing energy determination block 60 therefore determines the balancing energy $E_a$ depending on the power indicator Ind. A time constant T, which may also be a sampling time T, and a location factor K as well as an energy reserve $E_R$ are proposed as further influencing variables. The sampling time can also correspond in terms of its length to a reference time interval. One option for determining the amount of balancing energy $E_a$ is by calculation according to the following formula:

In said formula, $E_a$ denotes the amount of balancing energy to be determined, Ind denotes the power indicator, K denotes a location factor, $C_{Res}$ denotes a factor for taking the energy reserve into account and T denotes a sampling time or a reference time interval.

The location factor K can preferably be composed of the product of $K_0$ and $K_R$, wherein $K_0$ can be used for standardization and $K_R$ can have the function of a weighting as a relative factor. $K_R$ can preferably assume values of from 0.5 to 2, to mention just one example. However, it is also considered, for example, that it assumes values of from 0 to 1, or values of from 0 to 100%, which is the same mathematically, or else other value ranges. Instead of a location factor K, however, other influencing variables that do not or do not only take into account the location of the relevant grid connection point can also be provided in addition or as an alternative. According to one embodiment, however, the location factor K, particularly the relative component $K_R$ thereof, takes into account the location of the grid connection point in the electrical supply grid.

The energy reserve can be taken into account by means of the factor $C_{Res}$. One option of implementation is that $C_{Res}$ assumes the value 1 as long as the energy reserve $E_R$ is greater than a minimum energy reserve $E_{Rmin}$. Said minimum energy reserve $E_{Rmin}$ can be, for example, 10% or 20% of a maximum energy reserve. If the energy reserve $E_R$ is then less than or equal to said minimum energy reserve $E_{Rmin}$, the energy reserve for said accounting factor $C_{Res}$ can be described with the formula $$C_{Res} = \frac{E_R}{E_{Rmin}}$$

Said accounting factor therefore assumes the value 1 as long as sufficient energy reserve is still present. However, if said energy reserve is dwindling, it bypasses to a factor proportional to the remaining residual energy.

The time constant T is preferably selected to be small so that it is at most 1 s. In particular, said time constant T can, however, be significantly lower and even drop to below the duration of a sampling time, such as 100 ms, 50 ms, 20 ms or only 10 ms, for example.

The power indicator Ind can be calculated, for example, as the quotient between the power balance $\Delta P$ and the sum of the nominal powers of all of the energy generators of the electrical supply grid or at least of the relevant electrical supply grid. Alternatively, the power indicator can be calculated from a change in frequency $\Delta f$ in comparison to a maximum permissible change in frequency $\Delta f_{max}$. Depending on the selection of the calculation of the power indicator Ind, this can of course have effects on the calculation formula mentioned above for the amount of balancing energy. In particular, the selection of the calculation of the power indicator Ind and hence also the selection of the power indicator Ind as such can be taken into account by the basic value or the standardization value $K_0$ of the location factor K.

According to one embodiment, which is not restricted to the features according to FIG. 4, the amount of balancing energy can also be calculated and used analogously as the balancing power, which corresponds to the amount of balancing energy divided by a or the reference time interval.

Figure 5:
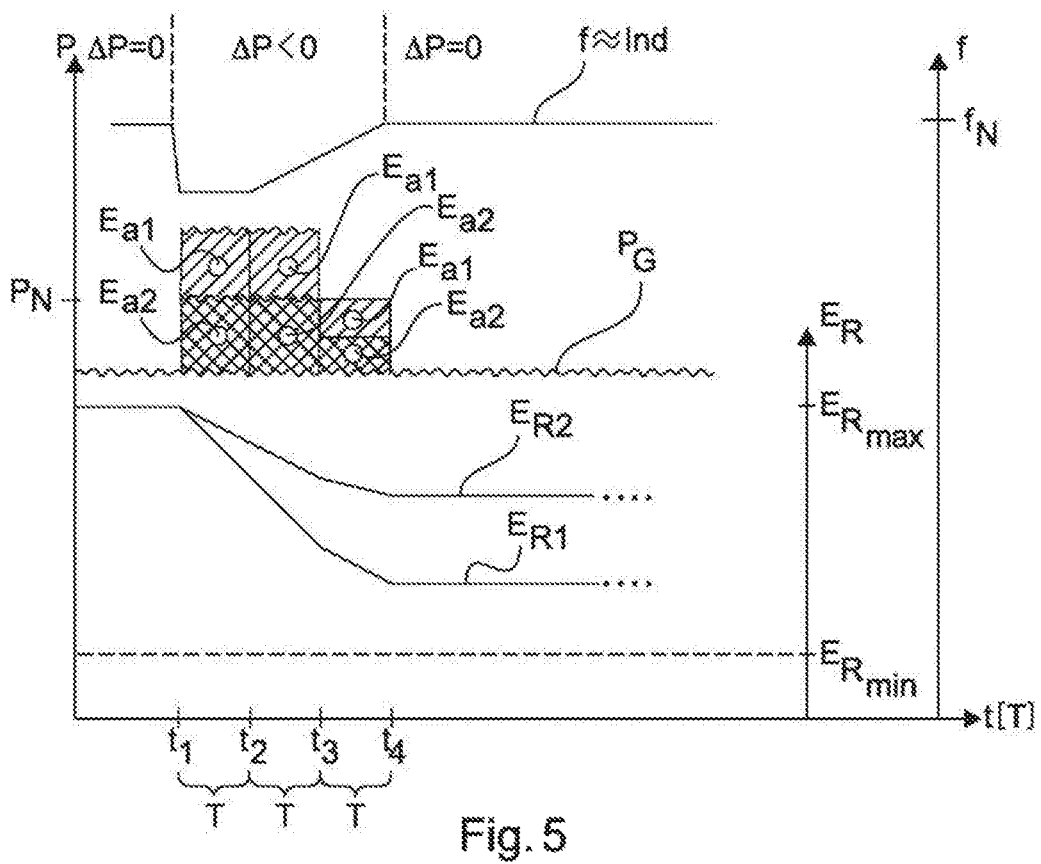
FIG. 5 illustrates a graph of a possible type and functioning of the infeed of balancing energy.

FIG. 5 now illustrates schematically and by way of example the functioning of the proposed solution according to one embodiment. This is also intended to serve, in particular, for the basic explanation of the proposed solution. In principle, the profiles shown in FIG. 5 can be a result of the operation of an electrical supply grid 2 according to FIG. 3.

The graph of FIG. 5 contains a plurality of profiles, which are plotted depending on the time t. T is specified here as a unit and can be 1 s, for example. The relevant range of the graph of FIG. 5 illustrated below, which range shows the disturbance, would then thus extend from $t_1$ to $t_4$, over 3 s. The total period of 3 s can also be assumed approximately as an average value for the disturbance illustrated. For the time constant T, however, it is proposed, for the practical implementation, to use lower values, or to use at least no large values.

A frequency f is plotted as the uppermost profile, which in this case can also act as the power indicator Ind. Initially, namely before the time $t_1$, the frequency has a nominal frequency $f_N$. The frequency f thus has the desired value and the power balance $\Delta P$ is ideally 0. At the time $t_1$, the frequency f then falls abruptly, at least steeply, which means that the power balance $\Delta P$ is negative. At the time $t_2$, the frequency then increases to the nominal value again over the time $t_3$ up to the time $t_4$ and it can therefore be assumed from the time $t_4$ that the power balance $\Delta P$ is 0 again, that is to say it has balanced out again. The representation is of course only for illustrative purposes and is idealized.

The infed power is plotted at the bottom of the graph. With respect to FIG. 3, it is assumed that both wind farms WP1 and WP2 feed in the same basic power $P_G$. This is shown by an approximately horizontal line with slight fluctuations. In this example, said basic power $P_G$ is below the rated power $P_N$.

At the time $t_1$, when the frequency drops sharply and a negative power balance is therefore to be assumed, an amount of balancing energy $E_{a1}$ is calculated by the wind farm WP1 or in the farm control apparatus 26 thereof. At the same time, the wind farm WP2 calculates an amount of balancing energy $E_{a2}$ in the farm control apparatus 28 thereof. Said two amounts of balancing energy $E_{a1}$ and $E_{a2}$ are calculated for the time T, that is to say for the period from $t_1$ to $t_2$, and are also fed in in said period of time in a targeted manner. The infed power accordingly increases from the basic power $P_G$ for this. The respectively determined and then also infed amount of balancing energy $E_{a1}$ and $E_{a2}$ is therefore the surface area underneath said power level that is increased with respect to the basic power $P_G$. The amount of balancing energy $E_{a1}$ of the first wind farm WP1 relates to the entire region down to the value of the basic power $P_G$, whereas the second amount of balancing energy $E_{a2}$ of the second wind farm WP2 is only half as large and relates only to the cross-hatched region.

In this case, to determine the two amounts of balancing energy $E_{a1}$ and $E_{a2}$, the same calculation is initially taken as a basis, and it has been explained at the beginning that, for the sake of simplicity, it is assumed that the two wind farms WP1 and WP2 are at least dimensioned identically.

The situation illustrated here in the graph of FIG. 5 is intended to reflect the situation in which the first factory 10 is reconnected through closure of the first switch S1 and hence causes said drop in the power balance through the sudden draw of the power $P_2$. The first wind farm WP1 is significantly closer to said first factory 10 and hence significantly closer to the cause of said power drop. A higher location factor K is accordingly proposed here, which is namely double as large as in the case of the wind farm WP2, which is arranged significantly further away, that is to say whose grid connection point is significantly further away from that of the first factory 10 and hence from that of the first wind farm WP1.

The two amounts of balancing energy $E_{a1}$ and $E_{a2}$ are thus accordingly of different magnitudes because of this, namely because of the selection of different location factors K. At the time $t_2$, the frequency f, which functions here as the power indicator Ind, still has said low value so that basically the same amounts of balancing energy $E_{a1}$ and $E_{a2}$ are calculated again. For the range from $t_2$ to $t_3$, the same infed amounts of balancing energy and hence the same two energy blocks that indicate the amount of energy and are illustrated in a hatched or cross-hatched manner thus result once more.

At the time $t_3$, the frequency and hence the power balance have picked up again somewhat and, although the amounts of balancing energy $E_{a1}$ and $E_{a2}$ are then therefore still calculated in the same way, also using the same different location factors K, result in lower values on account of the restored frequency f, that is to say on account of the again changed power indicator Ind. In the illustrated example, said values are namely approximately half the previous values. At the same time, however, the second amount of balancing energy $E_{a2}$ is again only half as large as the first amount of balancing energy $E_{a1}$. From the time $t_4$ the situation has calmed down again, the frequency has reached its nominal value and it therefore indicates, as the power indicator Ind, that the power balance ΔP is approximately 0. Also, amounts of balancing energy are accordingly no longer determined or they have the value of 0.

At the same time, for both wind farms WP1 and WP2, the energy reserve $E_{R1}$ and $E_{R2}$, respectively, is taken into account. At the time $t_1$, both of said wind farms still have their respective maximum values, that is to say the maximum energy reserve $E_{Rmax}$, but then drop to a different extent because different amounts of balancing energy $E_{a1}$ and E are calculated, fed in and hence also required. However, a minimum value of the energy reserve $E_{Rmin}$ is also shown in the graph. Since neither of the two energy reserves $E_{R2}$ and $E_{R1}$ drop to said minimum value $E_{Rmin}$, this has no effect in the example shown and for the selected consideration of the energy reserve. Here, namely in this example, it is proposed that a formula as explained above is used, in which the energy reserve can be incorporated by means of the accounting factor $C_{Res}$ and that said accounting factor $C_{Res}$ is also calculated as has been specified above in a formula, namely that said accounting factor has the value of 1 as long as the energy reserve is above the minimum energy reserve $E_{Rmin}$.

Figure 6:
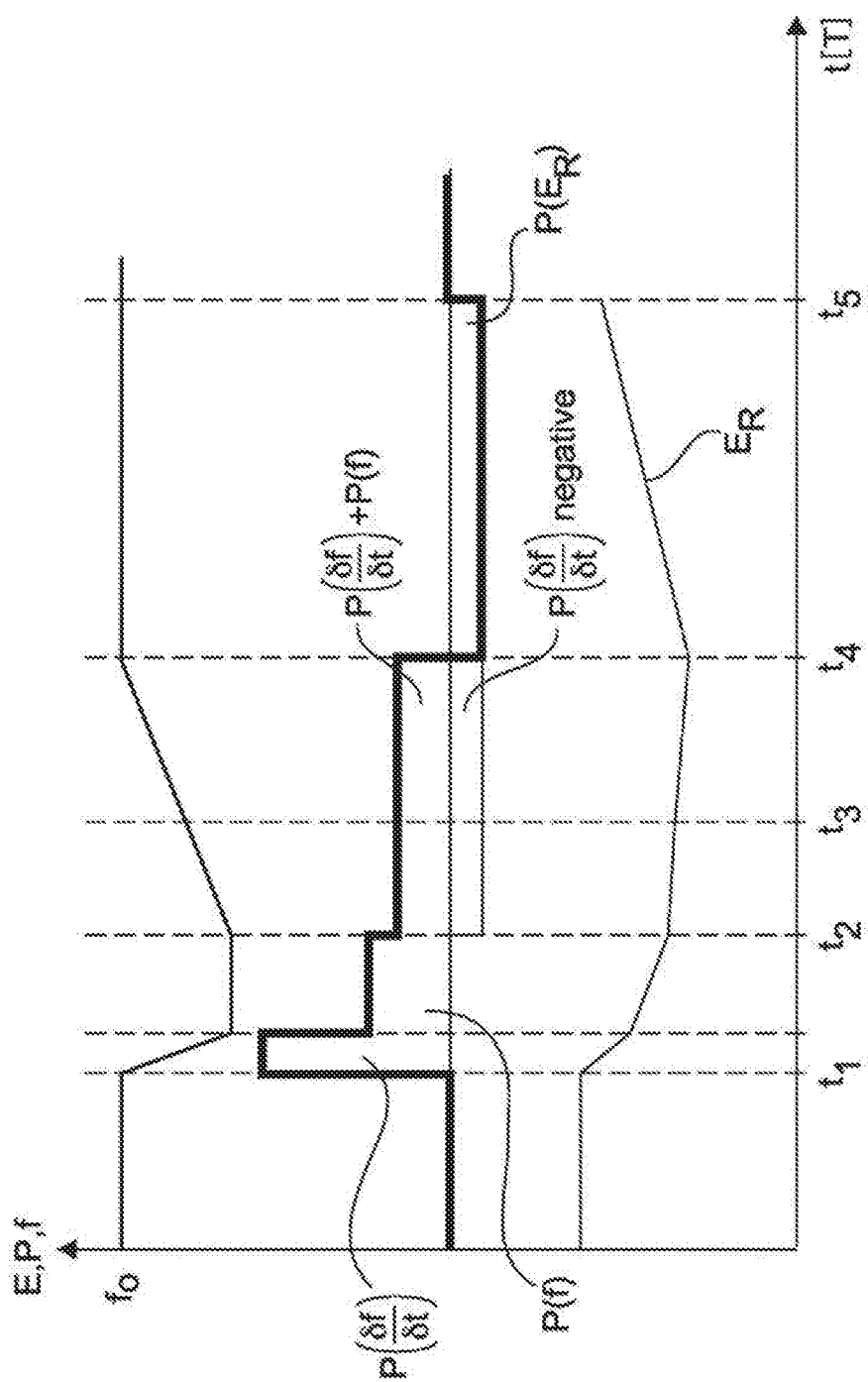
FIG. 6 illustrates a further graph of a further possible type and functioning of the infeed of balancing energy.

FIG. 6 shows a graph in which a frequency profile f, a power profile P and a profile of the energy reserve $E_R$ is shown by way of example over time, which is plotted on the abscissa.

The frequency initially starts at nominal frequency $f_0$. At the same time, the power P has a value that corresponds to the wind power that is present at the moment and initially runs horizontally. With respect to the power P, it is simply assumed that the wind power does not change over the period observed in FIG. 6.

Furthermore, the energy reserve $E_R$ begins at a value at which the corresponding store is fully charged.

A sharp drop in frequency then results at the time $t_1$. Said drop in frequency indicates a significant and sharp drop in the power balance. This sharp change in frequency leads in the case of the power P initially to a high value having a comparatively high amount of energy for the short period. This large amount of balancing energy of this first pulse is intended, in particular, to counteract the sharp fall in frequency.

A new amount of balancing energy is calculated a short time later, wherein a larger time interval is also set, namely up to the time $t_2$. This second balancing energy is likewise still great but is distributed over a longer period. This second amount of balancing energy results from the low frequency value prevailing there, wherein, however, a sharp fall in frequency is no longer involved.

At the time $t_2$, the frequency then increases again so that a larger time interval is set for the balancing energy, namely up to the time $t_4$. Even though the frequency picks up again, a comparatively large amount of balancing energy that takes the increasing frequency into account both with respect to its change in frequency and the absolute values is provided on account of the large time interval.

At the time $t_4$, the frequency assumes the nominal frequency value $f_0$ again and the change in frequency is approximately 0. The infeed of an amount of balancing energy is no longer required. Nevertheless, a negative amount of balancing energy is now provided, namely in order to charge the store again.

The profile of the energy reserve of the relevant store is therefore also illustrated in said graph of FIG. 6. It can be seen that the energy reserve drops sharply at the time $t_1$ then drops further up to the time $t_2$ but no longer as sharply. It falls even less sharply from the time $t_2$ to $t_4$ and then reaches its minimum value at $t_4$. At $t_4$, an amount of balancing energy for grid support is now no longer required and then the recharging of the store is therefore begun. The energy reserve $E_R$ thus increases again then up to the time $t_5$ and has reached full charge again there. The amount of balancing energy then corresponds to the value 0 from the time $t_5$. The power then again there has the value that can be provided on account of the prevailing wind.

Said FIG. 6 therefore illustrates the calculation of an amount of balancing energy, which depends on the absolute value of the frequency f and on a derivative of the frequency, that is to say depends on df/dt, and which furthermore also still depends on the energy reserve in the store.

By way of the proposed solution, energy for supporting the grid can therefore be fed in immediately upon the occurrence of the power drop through the use of an algorithm. At the same time, during said dynamic process of taking account, it is also possible to still take the location of the grid connection point into account. This has no influence on the spontaneity of the grid support through said infeed of the amounts of balancing energy, but nevertheless provides the option of flexible management. Said flexible management can be effected by means of taking the location of the grid connection point into account, but other options are also considered. It is also considered to take a grid response to said infeed of the amount of balancing energy into account. Particularly when an oscillation or an amplifying reaction is detected, the infeed of the amount of balancing energy can be adapted, that is to say the determination of the amount of balancing energy can also be adapted, by means of the location factor K or in some other way.

The invention claimed is:

1. A method for feeding, at a grid connection point, electrical power into an electrical supply grid by at least one wind power installation or a wind farm having a plurality of wind power installations, comprising:
    monitoring a power indicator that is representative of a power balance in the electrical supply grid, the power balance being between fed in power into the electrical supply grid by a plurality of energy generators and drawn power from the electrical supply grid by a plurality of consumers, the power balance being positive when the fed in power is greater than the drawn power;
    determining an amount of balancing energy depending on the power indicator, wherein determining the amount of balancing energy includes:
        calculating the amount of balancing energy from a product of a change in the power indicator and a first adjustable location factor, or
        calculating the amount of balancing energy from a product of the power indicator and a second adjustable location factor;
    feeding in a basic electrical power depending on available wind power; and
    changing the feeding in of the basic electrical power by the determined amount of balancing energy.

2. The method as claimed in claim 1, further comprising:
    determining an energy reserve for the at least one wind power installation or the wind farm, wherein the energy reserve indicates an amount of energy available to be fed into the electrical supply grid in addition to the basic electrical power; and
    determining the amount of balancing energy depending on the energy reserve.

3. The method as claimed in claim 1, further comprising:
determining the amount of balancing energy for a reference time interval; and
reducing or increasing an amount of the basic electrical power that is fed in by said amount of balancing energy for said reference time interval.

4. The method as claimed in claim 1, further comprising:
determining the amount of balancing energy depending on the power indicator so that said amount of balancing energy is positive such that feeding in the basic electrical power increases, when the power balance reduces and is below a predetermined lower limit value; and
determining the amount of balancing energy depending on the power indicator so that said amount of balancing energy is negative such that feeding in the basic electrical power reduces, when the power balance increases and is above a predetermined upper limit value.

5. The method as claimed in claim 1, wherein:
the amount of balancing energy depends on the power indicator with a dependency function; and
the dependency function is variable, depends on the grid connection point, or both.

6. The method as claimed in claim 5, wherein the dependency function is changed, adjusted or selected depending on at least one of the following:
a system property of the electrical supply grid,
a system behavior of the electrical supply grid,
a system state of the electrical supply grid,
a dependency function of a further wind power installation or of a further wind farm,
an external specification from an operator of the electrical supply grid, or
a disconnection or reconnection of a grid section.

7. The method as claimed in claim 1, wherein the electrical supply grid has a grid frequency and the power indicator is determined from at least one of the variables from the following:
the grid frequency,
a time derivative of the grid frequency,
a grid voltage,
a measured power difference,
a model frequency modeled on the grid frequency, or
a phase angle between a phase of the grid voltage and a phase of the model frequency.

8. The method as claimed in claim 1, wherein feeding in the basic electrical power is done by a feed in device having an operating range, wherein while the feeding in the basic electrical power, the operating range of the feed in device departs for a predetermined balancing time interval.

9. The method as claimed in claim 8, wherein the operating range departs for the predetermined balancing time interval such that a clock frequency for generating a modulated current signal is reduced, a tolerance range for generating the modulated current signal is increased, or both.

10. The method as claimed in claim 1, wherein to feed in the amount of balancing energy,
rotational energy of the at least one wind power installation is used when feeding in of the basic electrical power is increased;
energy is stored as rotational energy in the at least one wind power installation when the infeed of the basic electrical power is reduced;
a power cutback of the at least one wind power installation takes place when feeding in of the basic electrical power is reduced; or
any combination thereof.

11. The method as claimed in claim 1, wherein
the at least one wind power installation or at least one of the plurality of wind power installations of the wind farm has a generator operated at a generator rotational speed, the method further comprising:
determining an expected value indicative of whether a change in the power balance is to be expected, and
changing the generator rotational speed depending on the expected value when said expected value indicates that the change in the power balance is to be expected.

12. A wind power installation for feeding electrical power into an electrical supply grid at a grid connection point, the wind power installation comprising:
a sensor for monitoring a power indicator that is representative of a power balance in the electrical supply grid, wherein the power balance indicates a differential power as a difference between:
power fed into the electrical supply grid by energy generators; and
power drawn from the electrical supply grid by consumers, wherein the power balance is positive when more power is fed in than is drawn;
a controller configured to determine an amount of balancing energy depending on the power indicator, wherein determining the amount of balancing energy includes:
calculating the amount of balancing energy from a product of a change in the power indicator and a first adjustable location factor, or
calculating the amount of balancing energy from a product of the power indicator and a second adjustable location factor; and
an inverter configured to feed the electrical power into the electrical supply grid at the grid connection point, wherein:
the controller is configured to cause:
the inverter to feed in a basic electrical power depending on available wind power; and
the inverter to change feeding in of the basic electrical power by the determined amount of balancing energy.

13. The wind power installation as claimed in claim 12, further comprising at least one battery configured to store an energy reserve.

14. The wind power installation as claimed in claim 13, wherein the at least one battery is external to the wind power installation, the inverter, or both the wind power installation and the inverter.

15. The wind power installation as claimed in claim 12, wherein
the controller is configured to generate the first or second adjustable location factors, wherein the controller receives a variable that influences the first or second adjustable location factors.

16. A wind farm having a plurality of wind power installations for feeding electrical power into an electrical supply grid at a grid connection point, the wind farm comprising:
a sensor for monitoring a power indicator that is representative of a power balance in the electrical supply grid, wherein the power balance indicates a differential power as a difference between:
power fed into the electrical supply grid by energy generators; and
power drawn from the electrical supply grid by consumers, wherein the power balance is positive when more power is fed in than is drawn; and a controller for determining an amount of balancing energy depending on the power indicator, wherein determining the amount of balancing energy includes:
  calculating the amount of balancing energy from a product of a change in the power indicator and a first adjustable location factor, or
  calculating the amount of balancing energy from a product of the power indicator and a second adjustable location factor,
wherein the controller controls the plurality of wind power installations so that:
  the plurality of wind power installations feed in a basic electrical power depending on available wind power; and
  the plurality of wind power installations change the feeding in of the basic electrical power by the determined amount of balancing energy.

17. The wind farm as claimed in claim 16, further comprising:
a battery configured to store additional energy to provide at least a part of the amount of balancing energy, and
an inverter configured to feed energy from the battery into the electrical supply grid.

18. The wind farm as claimed in claim 16, wherein:
the controller generates the first or second adjustable location factors, wherein the controller receives a variable that influences the first or second location adjustable factors.

* * * * *